United States Patent
Zisimopoulos et al.

(10) Patent No.: US 10,433,284 B2
(45) Date of Patent: Oct. 1, 2019

(54) BEARER MANAGEMENT FOR PROSE DIRECT DISCOVERY

(71) Applicant: QUALCOMM Incorporated, San Diego, CA (US)

(72) Inventors: Haris Zisimopoulos, London (GB); Hong Cheng, Bridgewater, NJ (US); Lenaig Genevieve Chaponniere, San Diego, CA (US); Sudhir Kumar Baghel, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 14/794,010

(22) Filed: Jul. 8, 2015

(65) Prior Publication Data
US 2016/0021649 A1   Jan. 21, 2016

Related U.S. Application Data

(60) Provisional application No. 62/024,502, filed on Jul. 15, 2014.

(51) Int. Cl.
*H04W 72/04* (2009.01)
*H04W 40/04* (2009.01)
(Continued)

(52) U.S. Cl.
CPC ......... *H04W 72/0406* (2013.01); *H04W 4/70* (2018.02); *H04W 28/0252* (2013.01);
(Continued)

(58) Field of Classification Search
CPC . H04W 28/0252; H04W 40/04; H04W 4/005; H04W 64/003; H04W 72/0406;
(Continued)

(56) References Cited

U.S. PATENT DOCUMENTS

| 2012/0069817 A1* | 3/2012 | Ling | H04W 36/14 370/331 |
| 2012/0149386 A1* | 6/2012 | Kumar | H04W 76/10 455/452.2 |

(Continued)

FOREIGN PATENT DOCUMENTS

| WO | WO-2011135800 A1 | 11/2011 |
| WO | WO-2014043500 A1 | 3/2014 |

OTHER PUBLICATIONS

ISA/EPO, International Search Report and Written Opinion of the International Searching Authority, Int'l. App. No. PCT/US2015/039655, dated Oct. 5, 2015, European Patent Office, Rijswijk, NL, 12 pgs.

(Continued)

*Primary Examiner* — Chirag G Shah
*Assistant Examiner* — Srinivasa R Reddivalam
(74) *Attorney, Agent, or Firm* — Holland & Hart LLP

(57) ABSTRACT

Methods, systems, and devices are described for improving resource management in wireless communications. More particularly, the methods systems and devices relate to techniques for suspending bearers when not required, for example, for D2D communications. In one example, a mobile device may send a connection request that indicates a service type. The connection request may be a service request (SR) or an extended service request (ESR). A set of bearers may be established for the intended communication(s). The indicated service type may not require all bearers of the set of bearers such that at least one bearer may be suspended.

3 Claims, 16 Drawing Sheets

(51) Int. Cl.
*H04W 28/02* (2009.01)
*H04W 64/00* (2009.01)
*H04W 76/23* (2018.01)
*H04W 4/70* (2018.01)
*H04W 76/27* (2018.01)
*H04W 88/02* (2009.01)
*H04W 88/08* (2009.01)
*H04W 88/16* (2009.01)

(52) U.S. Cl.
CPC ......... *H04W 40/04* (2013.01); *H04W 64/003* (2013.01); *H04W 76/23* (2018.02); *H04W 76/27* (2018.02); *H04W 88/02* (2013.01); *H04W 88/08* (2013.01); *H04W 88/16* (2013.01)

(58) Field of Classification Search
CPC . H04W 76/043; H04W 76/046; H04W 88/02; H04W 88/08; H04W 88/16
See application file for complete search history.

(56) References Cited

U.S. PATENT DOCUMENTS

| | | | | |
|---|---|---|---|---|
| 2012/0163296 A1* | 6/2012 | Cheon | ................... | H04W 76/10 370/328 |
| 2012/0264443 A1* | 10/2012 | Ng | ........................ | H04W 60/04 455/450 |
| 2012/0300750 A1* | 11/2012 | Chin | ................. | H04W 36/0022 370/331 |
| 2013/0051326 A1 | 2/2013 | Jeyatharan et al. | | |
| 2013/0083646 A1* | 4/2013 | Hietalahti | ............. | H04W 76/30 370/216 |
| 2013/0107863 A1* | 5/2013 | Faccin | ............... | H04W 36/0022 370/331 |
| 2013/0136114 A1* | 5/2013 | Hietalahti | ............... | H04W 4/22 370/338 |
| 2013/0188601 A1* | 7/2013 | Sun | ........................ | H04W 36/14 370/331 |
| 2014/0341112 A1* | 11/2014 | Agiwal | .................... | H04L 67/14 370/328 |
| 2015/0195865 A1* | 7/2015 | Lee | ........................ | H04W 76/14 455/426.1 |
| 2016/0183156 A1* | 6/2016 | Chin | ................. | H04W 36/0022 370/331 |
| 2016/0219605 A1* | 7/2016 | Karlsson | ............... | H04W 72/06 |
| 2017/0041818 A1* | 2/2017 | Lee | ........................ | H04L 1/1829 |
| 2017/0048922 A1* | 2/2017 | Lee | ........................ | H04W 76/38 |

OTHER PUBLICATIONS

IPEA/EP, Second Written Opinion of the International Preliminary Examining Authority, Int'l. App. No. PCT/US2015/039655, dated Jun. 3, 2016, European Patent Office, Berlin, DE, 7 pgs.

China Unicom: "Small Data from M2M Device gathering via D2D Relay", , 3GPP TSG-SA WG2 #101bis S2-140594, 3GPP, Feb. 11, 2014, 2 pages.

Ericsson et al., "Addressing Concerns with UP Optimizations for Small Data", 3GPP TSG-SA WG2#97 S2-132147, 3GPP, May 29, 2013, 6 pages.

* cited by examiner

BEARER MANAGEMENT FOR PROSE DIRECT DISCOVERY

CROSS REFERENCES

The present Application for Patent claims priority to U.S. Provisional Patent Application No. 62/024,502 by Zisimopoulos et al., entitled "Bearer Management for Prose Direct Discovery," filed Jul. 15, 2014, assigned to the assignee hereof, and expressly incorporated by reference herein.

FIELD OF THE DISCLOSURE

The following relates generally to wireless communication, and more specifically to resource management.

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

Further, mobile devices may communicate directly with each other via device-to-device (D2D) communications. Proximity based services (ProSe) is one approach for D2D communications. Base stations or other network devices, however, may still be involved during the initialization of D2D communications. For example, initialization of a mobile device that is to be used for typical base station-supported communications in a Long Term Evolution (LTE) system involves an entity referred to as a Mobility Management Entity (MME) that activates radio bearers for all active evolved packet system (EPS) bearers that could be used by the mobile device. Similarly, in D2D communications initialization, an MME may also activate all of the radio bearers that might normally be used by a mobile device, even when the mobile device is involved in D2D communications.

However, no EPS bearer is actually required for D2D communications because the traffic goes directly between mobile devices. Thus, establishing the bearers (radio and EPS) and keeping the bearers active uses network resources unnecessarily.

SUMMARY

The described features generally relate to one or more improved systems, methods, and/or apparatuses for improving resource management in wireless communications. More particularly, the described features relate to techniques for suspending bearers when not required, for example, for D2D communications. In one example, a mobile device may send a connection request that indicates a service type. The connection request may be a service request (SR) or an extended service request (ESR). A set of bearers may be established for the intended communication(s). The indicated service type may not require all bearers of the set of bearers such that at least one bearer of the set of bearers may be suspended.

A method for wireless communications is described. According to one implementation, the method may involve sending, from a user equipment (UE), a connection request that indicates a service type. A set of bearers may be established. Based at least in part on the indicated service type, at least one bearer of the set of bearers may be suspended.

In some examples, the connection request may indicate that the service type is device-to-device (D2D) communication.

In some examples, sending the connection request may involve sending an extended service request (ESR) to a base station. The ESR may indicate the service type and may include an evolved packet system (EPS) bearer context status information element (IE) that indicates a subset of EPS bearers of the set of bearers that are to be active.

In such examples, the method may involve receiving, at the UE, a message in response to the ESR. The received message may establish at least one radio bearer corresponding to a respective EPS bearer of the subset indicated by the EPS bearer context status IE to be active. The method also may involve locally suspending each EPS bearer of the set of bearers for which no corresponding radio bearer is established.

In some examples, the method may involve sending, from the UE, a second ESR that indicates a second service type and includes a second EPS bearer context status IE that indicates a second subset of EPS bearers of the set of bearers that are to be active. In such examples, the method also may involve receiving, at the UE, a second message in response to the second ESR that establishes at least one radio bearer. Each established radio bearer may correspond to a respective EPS bearer indicated by the second EPS bearer context status IE to be active. The method also may involve activating from suspension each respective EPS bearer for which a corresponding radio bearer is established.

In some examples, the method may involve identifying uplink data to be sent by the second service type to trigger sending the second ESR. In such examples, identifying uplink data to be sent by the second service type may involve identifying a radio resource control (RRC) error.

In some examples, the method may involve sending, from the UE, a communication to activate all EPS bearers of the set of bearers when data is to be sent from the UE by a second service type. In such examples, sending the communication may involve sending a tracking area update (TAU) request.

In some examples, the method may involve receiving, at the UE, a second message in response to the communication. In such examples, the method may involve activating each locally suspended EPS bearer based at least in part on the second message.

In some examples, the method may involve receiving, at the UE, a second message when downlink data is pending for the UE. In such examples, the method may involve sending, from the UE, a second ESR in response to the second message. The method also may involve activating each locally suspended EPS bearer as indicated in the second ESR.

In some examples, the method may involve receiving, at the UE, a second message when downlink data is pending for the UE, the second message indicating at least one EPS bearer of the set of bearers for the pending downlink data. In such examples, the method may involve configuring at least one data resource bearer (DRB) corresponding to the indicated at least one EPS bearer.

In some examples, sending the connection request may involve sending a service request (SR) that indicates the service type. In such examples, the method may involve establishing a radio resource control (RRC) connection with a base station based at least in part on the indicated service type. The method also may involve receiving, at the UE from the base station, a message indicating that at least one data radio bearer (DRB) of the set of bearers will not be established, thereby suspending the at least one DRB.

In some examples, the method may involve configuring a dummy packet data convergence protocol (PDCP) and a dummy radio link control (RLC) based at least in part on the received message.

In some examples, the method may involve identifying uplink data to be sent by a second service type. In such examples, the method may involve sending, from the UE, a communication to request resource allocation. The method also may involve receiving, at the UE, a second message indicating at least one DRB of the set of bearers for the uplink data. Further, the method may involve configuring the indicated at least one DRB.

In some examples, identifying uplink data to be sent by the second service type may involve identifying a radio resource control (RRC) error.

In some examples, the method may involve receiving, at the UE, a second message when downlink data is pending for the UE. The second message may indicate at least one DRB of the set of bearers for the downlink data. In such examples, the method may involve configuring the indicated at least one DRB.

An apparatus for wireless communications is described. In one configuration, the apparatus may include: means for sending, from a user equipment (UE), a connection request that indicates a service type; means for establishing a set of bearers; and, means for suspending at least one bearer of the set of bearers, the at least one suspended bearer based at least in part on the indicated service type. The apparatus may include these and/or other elements configured to carry out various operations of the methods described above and herein.

Another apparatus for wireless communications is described. According to one configuration, the apparatus may include: a communications manager configured to send, from a user equipment (UE), a connection request that indicates a service type; and, a bearer manager configured to establishing a set of bearers and to suspend at least one bearer of the set of bearers, the at least one suspended bearer based at least in part on the indicated service type. The apparatus may include these and/or other elements configured to carry out various operations of the methods described above and herein.

Another apparatus for wireless communications is described. According to one configuration, the apparatus may include: a processor; memory in electronic communication with the processor; and, instructions stored in the memory. The instructions may be executable by the processor to: send, from a user equipment (UE), a connection request that indicates a service type; establish a set of bearers; and, suspend at least one bearer of the set of bearers, the at least one suspended bearer based at least in part on the indicated service type. The instructions may be executable by the processor to perform these and/or other various operations of the methods described above and herein.

A non-transitory computer-readable medium is described. The medium may store computer-executable code for wireless communications. The code may be executable by a processor to: send, from a user equipment (UE), a connection request that indicates a service type; establish a set of bearers; and, suspend at least one bearer of the set of bearers, the at least one suspended bearer based at least in part on the indicated service type. The code may be executable by the processor to perform these and/or other various operations of the methods described above and herein.

Another method for wireless communications is described. According to one configuration, the method may involve: receiving, at a base station, a connection request that indicates a service type; establishing a set of bearers; and, suspending at least one of the set of bearers, the at least one suspended bearer based at least in part on the indicated service type. The method may involve performing these and/or other various operations described herein.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure relates to the management of resources for wireless communications. In particular, management of resources during D2D wireless communications is described. During a typical initialization of a D2D communications system, a mobile device, such as a user equipment (UE), may communicate with a Mobility Management Entity (MME), which may activate wireless communication bearers that aren't actually needed during D2D communications. While the wireless bearers may subsequently be used, temporary suspension of the wireless bearers during D2D communications may be beneficial for efficient management of wireless resources. Suspension of wireless bearers may be accomplished during D2D communications initialization as explained below.

In one example, a mobile device, e.g., a UE, may be set up for communicating directly with another mobile device via D2D communications. During setup, the mobile device may indicate a service type corresponding to D2D communications with a connection request. The mobile device may further indicate a subset of EPS bearers, of a set of bearers, that are to be active. Further, the mobile device may locally suspend the EPS bearers that are to be inactive and for which no corresponding radio bearer is established.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
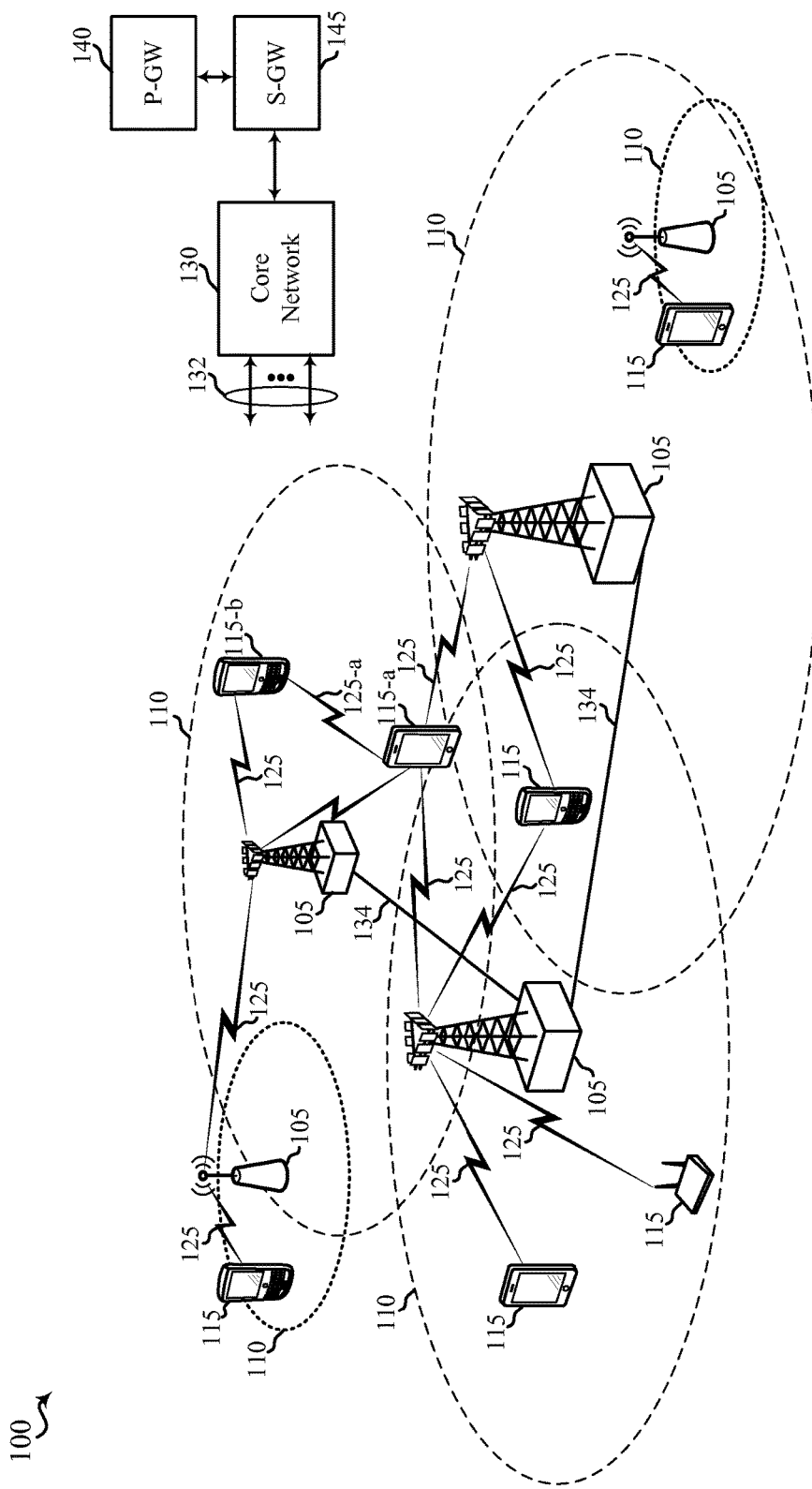
FIG. 1 shows a block diagram of a wireless communication system, in accordance with various aspects of the present disclosure.

Referring first to FIG. 1, a block diagram of a wireless communication system 100 in accordance with various aspects of the present disclosure is shown. The wireless communication system 100 may include a plurality of base stations (e.g., eNBs, or wireless local area network (WLAN) access points) 105, a number of user equipment (UEs) 115, and a core network 130. Some of the base stations 105 may communicate with the UEs 115 under the control of a base station controller (not shown), which may be part of a core network 130 (e.g., including an MME) or certain base stations 105 (e.g., eNBs) in various implementations. Some of the base stations 105 may communicate control information and/or user data with the core network 130 through a backhaul 132. The system 100 may also include a packet data network gateway (P-GW) 140 in communication with a serving gateway (S-GW) 145 in communication with the core network 130.

In some implementations, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, scheduling information, data, etc.

The base stations 105 may wirelessly communicate with the UEs 115 via one or more base station antennas. Each of the base stations 105 may provide communication coverage for a respective coverage area 110. In some implementations, a base station 105 may be referred to as a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for a base station 105 may be divided into sectors (not shown) making up only a portion of the respective coverage area 110. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas 110 of different base stations 105, including the coverage areas of the same or different types of base stations 105, utilizing the same or different radio technologies, and/or belonging to the same or different access networks, may overlap. The coverage areas 110 may be considered to define cells, such as macro cells and small cells (e.g., femto cells, pico cells, etc.) as illustrated in FIG. 1. Although the small cells are shown with only a single UE 115 within the respective coverage areas for simplicity, it should be understood that any number of UEs 115 may be within the coverage area of a small cell.

The core network 130 may communicate with the base stations 105 via the backhaul 132 (e.g., S1 application protocol, etc.). The base stations 105 may also communicate with one another, directly or indirectly, via backhaul links 134 (e.g., X2 application protocol, etc.) and/or via backhaul 132 (e.g., through core network 130). The wireless communication system 100 may support synchronous or asynchronous operation. For synchronous operation, the base stations may have similar frame and/or gating timing, and transmissions from different base stations may be approximately aligned in time. For asynchronous operation, the base stations may have different frame and/or gating timing, and transmissions from different base stations may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other wireless wide area network (WWAN) access networks, or WLAN access networks.

The communications links 125 shown in wireless communication system 100 may include uplinks for carrying uplink (UL) transmissions (e.g., from a UE 115 to a base station 105) and/or downlinks for carrying downlink (DL) transmissions (e.g., from a base station 105 to a UE 115). The UL transmissions may also be called reverse link transmissions, while the DL transmissions may also be called forward link transmissions. The downlink transmissions may be made using a licensed spectrum (e.g., LTE), an unlicensed spectrum, or both. Similarly, the uplink transmissions may be made using a licensed spectrum (e.g., LTE), an unlicensed spectrum, or both.

In some implementations, the UEs 115 of the wireless communication system 100 may be configured to communicate directly with one another. For example, a first UE 115-*a* may communicate with a second UE 115-*b* over a communications link 125-*a* (e.g., D2D communications). While only the first UE 115-*a* and the second UE 115-*b* are illustrated in FIG. 1 as supporting D2D communications, it should be understood that other UEs 115 of the wireless communication system 100 may be configured for D2D communications as well. As such, the first UE 115-*a* may communicate with additional ones of the UEs 115. Further, multiple UEs 115 may form a D2D network, such as a mesh network.

As discussed above, a set of bearers may be established for intended communications for a given UE 115. For D2D communications, for example, the first UE 115-*a* may not require all bearers of the set of bearers. As such, at least one bearer of the set of bearers may be suspended. For example, the EPS bearers other than a default EPS bearer may be locally suspended at the first UE 115-*a* when being set up for D2D communications with the second UE 115-*b*. Such suspension may conserve network resources.

In one example, a mobile device, e.g., a UE 115 of the system 100, may be set up for communicating directly with another mobile device via D2D communications. The mobile device may send a connection request, e.g., an extended service request (ESR), that indicates a service type corresponding to D2D communications. A set of bearers may be established for the D2D communications. The ESR may further include an evolved packet system (EPS) bearer context status information element (IE) that indicates a subset of EPS bearers of the set of bearers that are to be active. For example, the IE may indicate a default EPS bearer to be active.

The MME of the network with which the mobile device is associated may be informed of the suspension of bearers via a base station, e.g., eNB. The MME may suspend the EPS bearers that are not indicated as active by the UE in the EPS bearer context status IE. The MME may preserve and suspend these EPS bearers, for example, by sending a message to an associated serving gateway (S-GW) to notify the S-GW of the suspension of bearers. The S-GW may in turn send a message to an associated packet data network gateway (PDN-GW or P-GW) to notify the P-GW of the suspension of bearers.

The UE may establish a default radio bearer or data radio bearer (DRB) with the base station. Upon establishment of the default DRB, the UE may locally suspend the EPS bearers for which no corresponding radio bearer has been established (e.g., the EPS bearers of the set of bearers other than the default EPS bearer).

Figure 2:
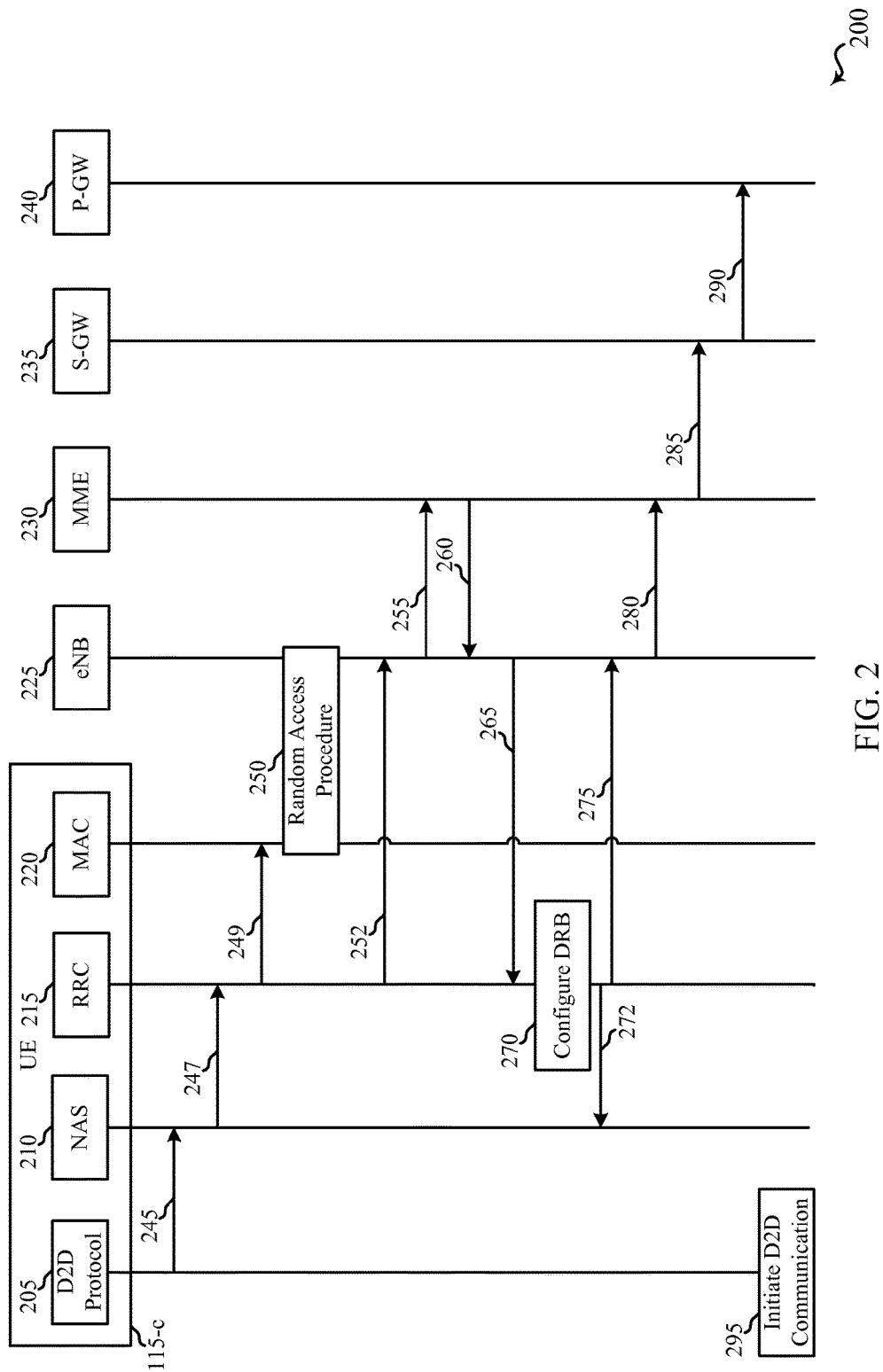
FIG. 2 shows a diagram illustrating one example of communications and actions that may be involved for setting up D2D communication for a mobile device, in accordance with various aspects of the present disclosure.

FIG. 2 shows a diagram illustrating one example 200 of communications and actions that may be involved for setting up D2D communication for a mobile device or UE 115-*c*. The UE 115-*c* may include a D2D protocol component 205, a non-access stratum (NAS) component 210, a radio resource control (RRC) component 215 and a medium access control (MAC) component 220. The UE 115-*c* may be an example of one of the UEs 115 illustrated in FIG. 1.

A base station or eNB 225, which may be an example of one of the base stations 105 illustrated in FIG. 1, is shown in the example 200. Also, an MME 230, which may be part of the core network 130 illustrated in FIG. 1, is shown. Further, a serving gateway (S-GW) 235 and a packet data network gateway (P-GW) 240, which may be respective examples of the S-GW 145 and the P-GW 140 illustrated in FIG. 1, are shown.

The D2D protocol 205 may initiate the D2D set up process, e.g., when the UE 115-*c* needs resource allocation for direct discovery, by sending a message 245 to the NAS 210. The message 245 may be an extended service request (ESR) that indicates a service type (e.g., for D2D communications) and includes an evolved packet system (EPS) bearer context status information element (IE). The IE may indicate a subset of EPS bearers that are to be active (meaning that non-indicated EPS bearers may be suspended). The NAS 210 may send a message 247 to the RRC 215 forwarding the ESR. The RRC 215 may send a message 249 (e.g., an RRC connection request corresponding to the ESR) to the MAC 220, which then may initiate a random access procedure 250 with the eNB 225 to set up an RRC connection between the UE 115-*c* and the eNB 225. Once the RCC connection setup is established, the RRC 215 may send a message 252 to the eNB 225 to indicate that the RRC connection is complete and/or to forward the ESR that the RRC 215 received from the NAS 210.

The eNB 225 may send a message 255 (e.g., S1-AP: initial UE message) to the MME 230 to forward the ESR to the MME 230. If the ESR with the indicated service type is accepted by the MME 230, the MME 230 may respond by sending a message 260 to the eNB 225 to provide a UE context modification request. The eNB 225 may send a message 265 to the RRC 215 to reconfigure the RRC connection in accordance with the UE context modification request. The RRC 215 then may initiate a configure DRB procedure 270 to configure a data radio bearer (DRB) (e.g., configure a packet data convergence protocol (PDCP) and a radio link control (RLC) for each of the EPS bearers indicated to be active by the ESR). For example, the EPS bearer context status IE included in the ESR may indicate that only a default EPS bearer is to be active. In such case, the configure DRB procedure 270 may establish only a default DRB corresponding to the default EPS bearer.

Once the configure DRB procedure 270 is completed, the RRC 215 may send a message 272 to the NAS 210 to indicate the EPS bearer identity (e.g., the EPS bearer(s) and corresponding DRB(s)). Any EPS bearers for which there is no corresponding DRB according to the EPS bearer identity may be locally suspended by the UE 115-*c*.

The RRC 215 also may send a message 275 to the eNB 225 to indicate that the RRC connection reconfiguration is complete. Then the eNB 225 may send a message 280 to the MME 230 responding to the message 260 to indicate that the UE context modification is complete. The MME 230 may store in the UE context that the UE 115-*c* is in a suspended status for the suspended/indicated EPS bearers. The MME 230 may send a message 285 (e.g., a suspend notification message) to the S-GW 235 to inform the S-GW 235 of the bearers suspended for the UE 115-*c*. In turn, the S-GW 235 may send a message 290 to the P-GW 240 to inform the P-GW 240 of the suspended bearers. The P-GW 240 thus may be configured to discard packets (e.g., data) received on the suspended EPS bearers for the UE 115-*c*.

Alternatively, the MME 230 may not inform the S-GW 235 regarding bearer suspension. In such case, downlink data (not shown) for the UE 115-*c* received on the suspended bearer(s) may trigger the S-GW 235 to send a downlink data notification (also not shown) to the MME 230. With knowledge of the suspended bearers (e.g., marked suspended and stored in the UE context for the UE 115-*c*), the MME 230 may be configured to take suitable action for the downlink data, such as described further below.

As another alternative to informing the S-GW 235 regarding bearer suspension, the MME 230 may change the quality of service (QoS) configuration for each suspended bearer. For example, the MME 230 may send a message (not shown) to the S-GW 235 (or the P-GW 240) to request such modification of the suspended bearer(s). In such case, downlink data (not shown) for the UE 115-*c* received on the suspended bearer(s) may trigger the S-GW 235 (or the P-GW 240) to initiate bearer modification with a bearer QoS update procedure so that the suspended bearer(s) with pending downlink data may be activated or resumed from suspension.

Once the setup process is complete at the UE 115-*c*, a D2D communication procedure 295 may be performed by the UE 115-*c* (e.g., via the D2D protocol 205) to carry out D2D communications with another UE (e.g., including discovery, association and data communications). Although not shown in FIG. 2, the D2D protocol 205 may be informed that the transition of the UE 115-*c* to the D2D state has been successful. For example, the NAS 210 may send a trigger or other message to the D2D protocol 205 (e.g., with message 272), and/or the D2D protocol 205 may check the state (e.g., state of the NAS 210) to confirm.

Figure 3:
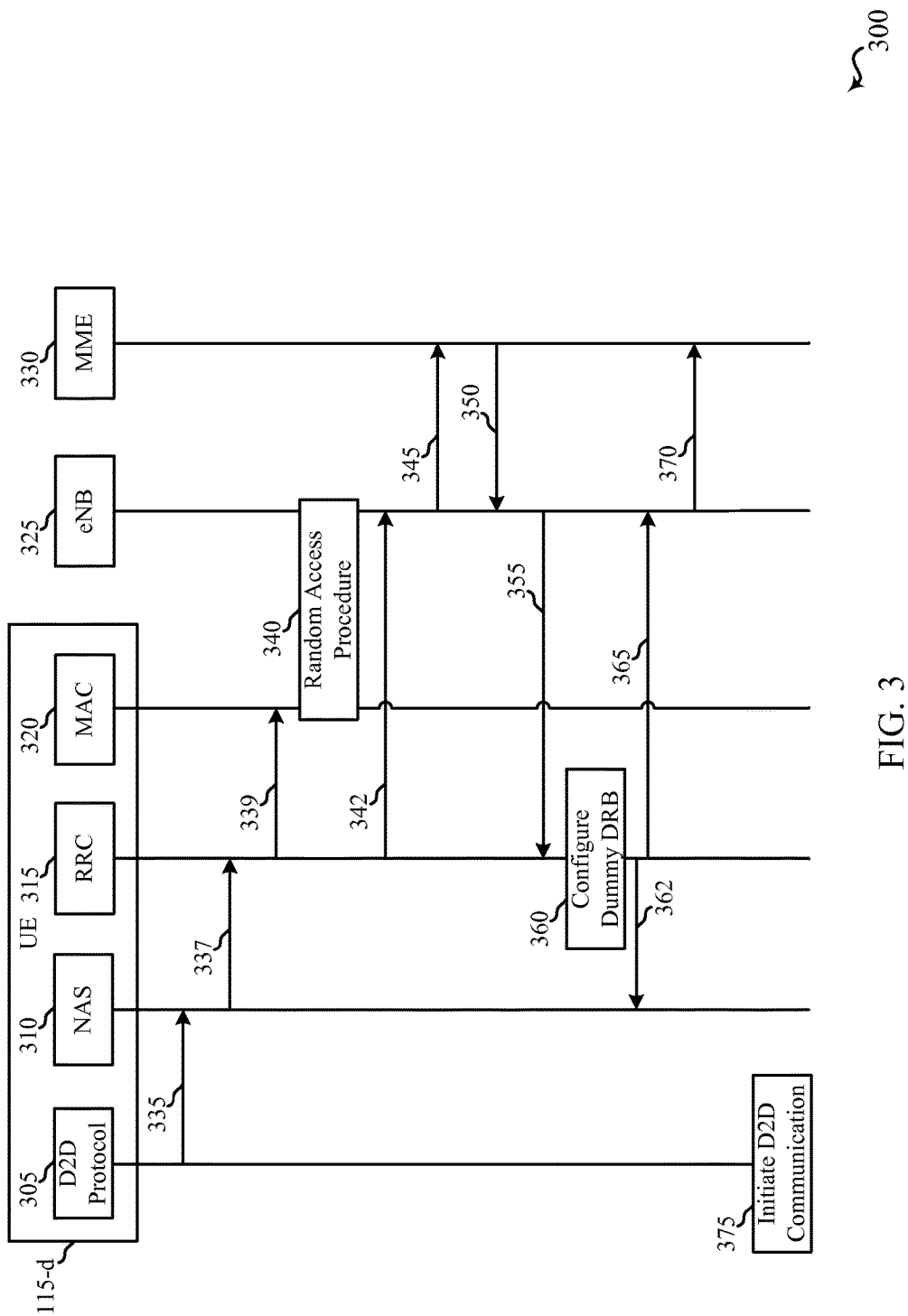
FIG. 3 shows a diagram illustrating another example of communications and actions that may be involved for setting up D2D communication for a mobile device, in accordance with various aspects of the present disclosure.

FIG. 3 shows a diagram illustrating another example 300 of communications and actions that may be involved for setting up D2D communication for a mobile device or UE 115-*d*. The UE 115-*d* may include a D2D protocol component 305, a non-access stratum (NAS) component 310, a radio resource control (RRC) component 315 and a medium access control (MAC) component 320. The UE 115-*d* may be an example of one of the UEs 115 illustrated in FIG. 1. Whereas in example 200 (of FIG. 2), the UE suspends the EPS bearers, in example 300, the eNB suspends the appropriate radio bearers.

A base station or eNB 325, which may be an example of one of the base stations 105 illustrated in FIG. 1, is shown in the example 300. Also, an MME 330, which may be part of the core network 130 illustrated in FIG. 1, is shown.

The D2D protocol 305 may initiate the D2D set up process, e.g., when the UE 115-*d* needs resource allocation for direct discovery, by sending a message 335 to the NAS 310. The message 335 may be a service request (SR) that indicates a service type (e.g., for D2D communications). The NAS 310 may send a message 337 to the RRC 315 forwarding the SR. The RRC 315 may send a message 339 (e.g., an RRC connection request corresponding to the SR) to the MAC 320, which then may initiate a random access procedure 340 with the eNB 325 to set up an RRC connection between the UE 115-*d* and the eNB 325. Once the RCC connection setup is established, the RRC 315 may send a message 342 to the eNB 325 to indicate that the RRC connection is complete and/or to forward the SR that the RRC 315 received from the NAS 310.

The eNB 325 may send a message 345 (e.g., S1-AP: initial UE message) to the MME 330 to forward the SR to the MME 330. If the SR is accepted by the MME 330, the MME 330 may respond by sending a message 350 to the eNB 325 to provide a UE context setup request. The eNB 325 may send a message 355 to the RRC 315 to reconfigure the RRC connection in accordance with the UE context setup request. However, because the eNB 325 knows that the SR is for a service type that does not require all bearers (e.g., for D2D communication), the eNB 325 may indicate in the message 355 that no DRB is to be established. Rather, the RRC 315 may initiate a configure dummy DRB procedure 360 to configure a dummy DRB (e.g., configure a dummy PDCP and a dummy RLC).

Once the configure dummy DRB procedure 360 is completed, the RRC 315 may send a message 362 to the NAS 310 to indicate the EPS bearer identity (so that the NAS 310 stops its timer and transitions to a connected state with the RRC 315). The RRC 315 also may send a message 365 to the eNB 325 to indicate that the RRC connection reconfiguration is complete. Then the eNB 325 may send a message 370 to the MME 330 responding to the message 350 to indicate that the UE context setup is complete (e.g., with success for all bearers as if the DRBs were established).

Once the setup process is complete at the UE 115-*d*, a D2D communication procedure 375 may be performed by the UE 115-*d* (e.g., via the D2D protocol 305) to carry out D2D communications with another UE (e.g., including discovery, association and data communications). Although not shown in FIG. 3, the D2D protocol 305 may be informed that the transition of the UE 115-*d* to the D2D state has been successful. For example, the NAS 310 may send a trigger or other message to the D2D protocol 305 (e.g., with message 362), and/or the D2D protocol 305 may check the state (e.g., state of the NAS 310) to confirm.

Although different approaches are described with respect to FIGS. 2 and 3, it should be understood that various aspects of these approaches may be combined to obtain further implementations. For example, the NAS based suspension operations of FIG. 2 may be combined with the new indication sent to the RRC, as explained with reference to FIG. 3. In such case, the default bearer may be replaced with a dummy bearer which does not need to be established over the air. Thus, additional conservation of radio resources (and less eNB processing) may be achieved.

Once the bearers have been suspended (using either the examples 200, 300, or a combination of examples 200 and 300, some suspended bearers may have need to be activated. Re-activation of previously suspended bearers is described with reference to FIGS. 4, 5 and 6.

Figure 4:
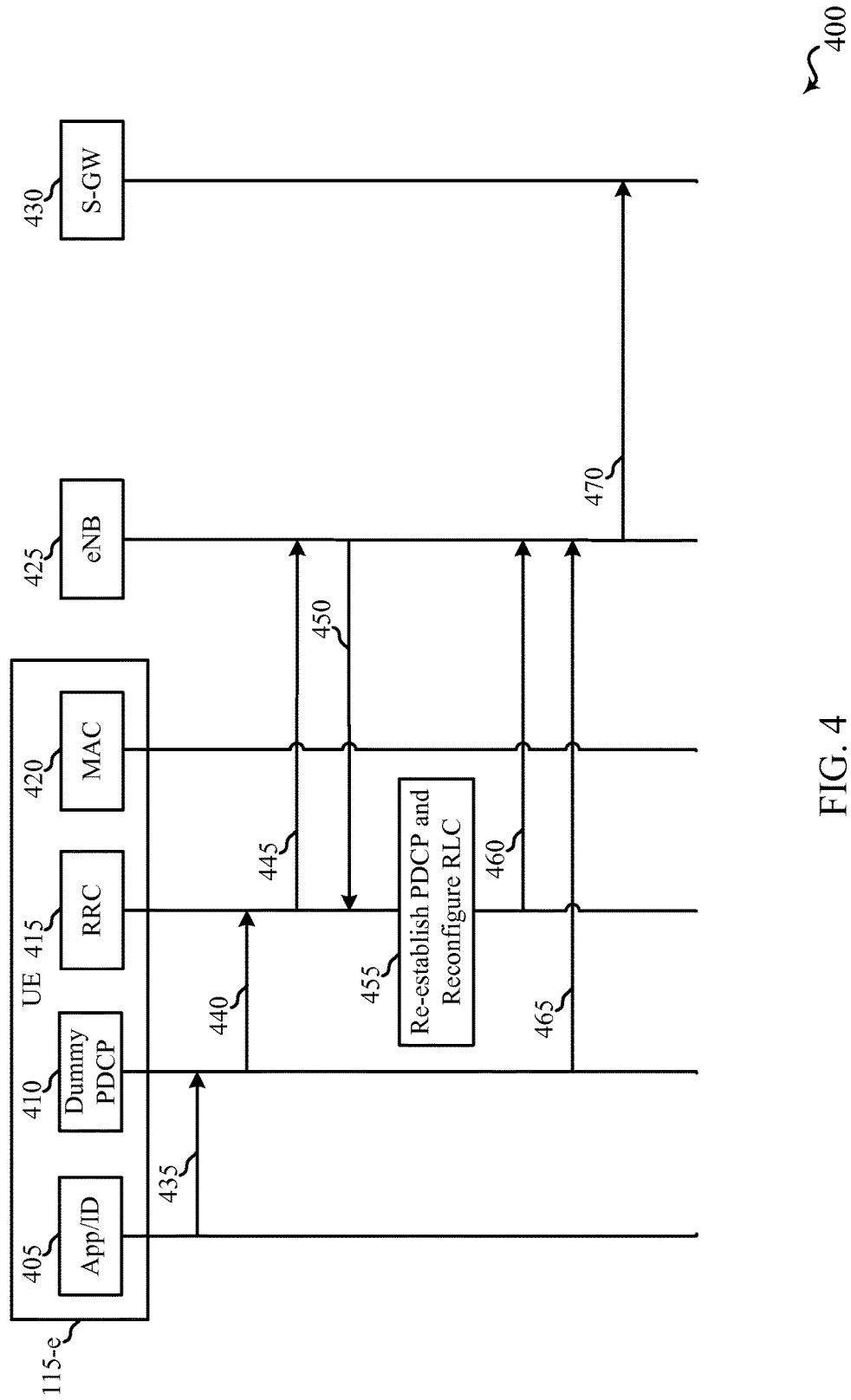
FIG. 4 shows a diagram illustrating one example of communications and actions that may be involved for resetting a mobile device for an uplink communication, in accordance with various aspects of the present disclosure.

FIG. 4 shows a diagram illustrating one example 400 of communications and actions that may be involved for resetting a UE 115-e for an uplink communication. In this example 400, the UE 115-e has been set up for D2D communications as described with reference to the UE 115-d in FIG. 3. Thus, the eNB-based suspension of FIG. 3 may have been implemented prior to the beginning of example 400.

The UE 115-e may include an application 405 (e.g., a particular application or the communications manager of the UE), a dummy PDCP component 410, a radio resource control (RRC) component 415 and a medium access control (MAC) component 420. The UE 115-e may be an example of one of the UEs 115 illustrated in FIG. 1.

A base station or eNB 425, which may be an example of one of the base stations 105 illustrated in FIG. 1, is shown in the example 400. Also, a serving gateway (S-GW) 430, which may be an example of the S-GW 145 illustrated in FIG. 1, is shown.

When having data to send (e.g., uplink data), the application 405 may send a message 435 to the dummy PDCP 410. The message 435 may include the data to be sent. The dummy PDCP 410 may send a message 440 to the RRC 415 indicating that data is to be sent. However, because the PDCP layer (and the RLC layer) is not configured properly to send the data, the message 440 may trigger an error. The RRC 415 may recognize the error and then send a message 445 (e.g., a UE assistance information message defined for resource allocation with a code corresponding to the service type for the data to be sent) to the eNB 425 to indicate that a DRB should be resumed (e.g., that the D2D service type configuration is to be discontinued). The interaction between the PDCP 410 and the RRC 415 for identifying the error may be implementation specific.

In response to the message 445, the eNB 425 may send a message 450 to the RRC 415 to perform an RRC connection reconfiguration procedure 455 to set up a DRB(s) for the data to be sent. For example, the message 445 may indicate the DRB(s) to be configured and used for the uplink data. The procedure 455 may involve re-establishing PDCP(s) and reconfiguring RLC(s) for the indicated DRB(s). Upon completion of the procedure 455, the RRC 415 may send a message 460 to the eNB 425 to indicate that the RRC connection reconfiguration is complete. The uplink data then may be sent, from the re-established PDCP (replacing the dummy PDCP 410), to the eNB 425 via a message 465. The eNB 425 may send the uplink data via a message 470 to the S-GW 430, which may forward the data to its destination(s).

Once the uplink data has been sent from the UE 115-e, the UE 115-e may be returned to the D2D communication mode, for example, by repeating the communications and actions such as described above with respect to FIG. 3.

When the UE 115-e has been set up for D2D communications as described with reference to the UE 115-c in FIG. 2, the example of FIG. 4 may not apply. Instead, the UE 115-e may be reset for an uplink communication (with data to be sent in a bearer(s) other than the default EPS bearer) by implementing a new connection request/ESR indicating another service type and including an EPS bearer context IE that indicates the suspended bearer(s) to be activated. Upon receiving the new ESR, the MME (not shown in FIG. 4) may activate the indicated bearer(s). The UE 115-e may locally resume corresponding EPS bearer(s) upon receiving an indication that the indicated radio bearer(s) is/are established.

Alternatively, the UE 115-e may send a tracking area update (TAU) request to the eNB 425 to activate all bearers of the set of bearers. This may be similar to the UE 115-e performing a transition from GSM/Edge radio access network (GERAN) without dual transfer mode (DTM) to LTE.

Figure 5:
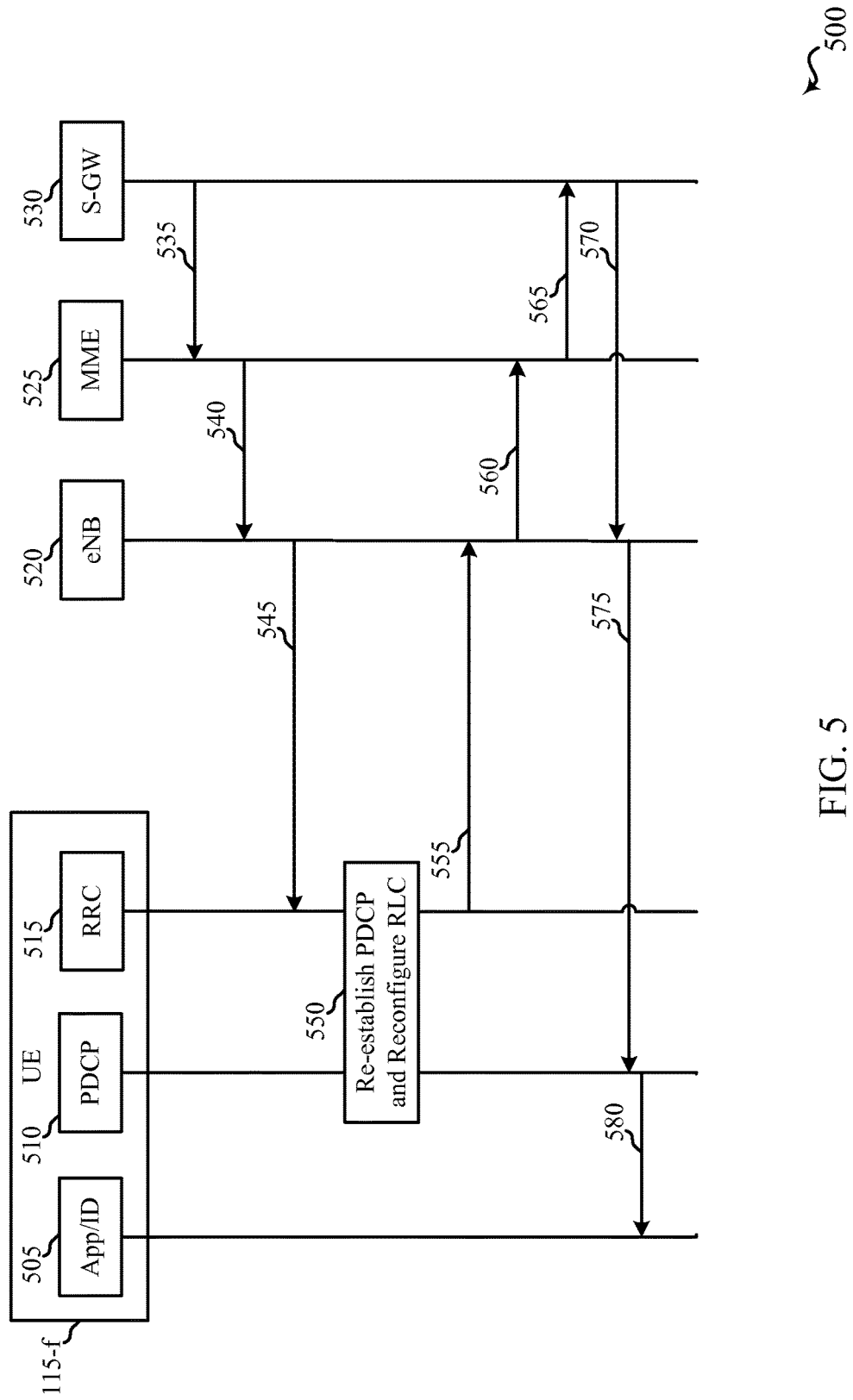
FIG. 5 shows a diagram illustrating one example of communications and actions that may be involved for resetting a mobile device for a downlink communication, in accordance with various aspects of the present disclosure.

FIG. 5 shows a diagram illustrating one example 500 of communications and actions that may be involved for resetting a UE 115-f for a downlink communication. In this example 500, the UE 115-f has been set up for D2D communications as described with reference to the UE 115-c in FIG. 2. Thus, the NAS- or UE-based suspension of FIG. 2 may have been implemented prior to the beginning of example 500.

The UE 115-f may include an application 505 (e.g., a particular application or the communications manager of the UE), a PDCP component 510 and a radio resource control (RRC) component 515. The UE 115-f may be an example of one of the UEs 115 illustrated in FIG. 1.

A base station or eNB 520, which may be an example of one of the base stations 105 illustrated in FIG. 1, is shown in the example 500. Also, an MME 525, which may be part of the core network 130 illustrated in FIG. 1, is shown. A serving gateway (S-GW) 530, which may be an example of the S-GW 145 illustrated in FIG. 1, is shown as well.

In the case that the S-GW 530 is not informed by the MME 525 regarding bearer suspension, receipt of downlink data for the UE 115-f on the suspended bearer(s) at the S-GW 530 may trigger the S-GW 530 to send a message 535 (e.g., a downlink data notification) to the MME 525. With knowledge of the suspended bearers (e.g., marked suspended and stored in the UE context for the UE 115-c), the MME 525 may send a message 540 (e.g., a S1-AP EPS bearer/E-RAB setup request message) to the eNB 520 to set up the bearer(s) for the downlink data. In response to the message 540, the eNB 520 may send a message 545 to the RRC 515 to perform an RRC connection reconfiguration procedure 550 to set up a DRB(s) for the data to be received. For example, the message 545 may indicate the DRB(s) to be configure and used for the downlink data. The procedure 550 may involve re-establishing PDCP(s) and reconfiguring RLC(s) for the indicated DRB(s).

Upon completion of the procedure 550, the RRC 515 may send a message 555 to the eNB 520 to indicate that the RRC connection reconfiguration is complete. The eNB 520 then may send a message 560 (e.g., a S1-AP EPS bearer/E-RAB setup response message) to the MME 525 to indicate that the bearer(s) for the downlink data is/are set up. Then the MME 525 may send a message (e.g., a modify bearer request message) 565 to the S-GW 530 to configure the S-GW 530 appropriately. The downlink data then may be sent from the S-GW 530 to the eNB 520 via a message 570. The eNB 520 may send the downlink data via a message 575 to the PDCP 510 (re-established), which may forward the downlink data to the application 505 via a message 580.

Alternatively, the message 540 from the MME 525 to the eNB 520 may be, for example, a connected mode paging message (e.g., a new NAS message that provides a packet switched (PS) service notification). The eNB 520 then may send a message (not shown) to the UE 115-f to trigger the UE 115-*f* to send a new ESR with the suspended EPS bearers indicated to be active in the EPS bearer context status IE. In such case, the UE 115-*f* may be set up (with suitable random access procedure, configure DRB procedure, etc.) to receive the downlink data.

Once the downlink data has been received by the UE 115-*f*, the UE 115-*f* may be returned to the D2D communication mode, for example, by repeating the communications and actions such as described above with respect to FIG. 2.

Figure 6:
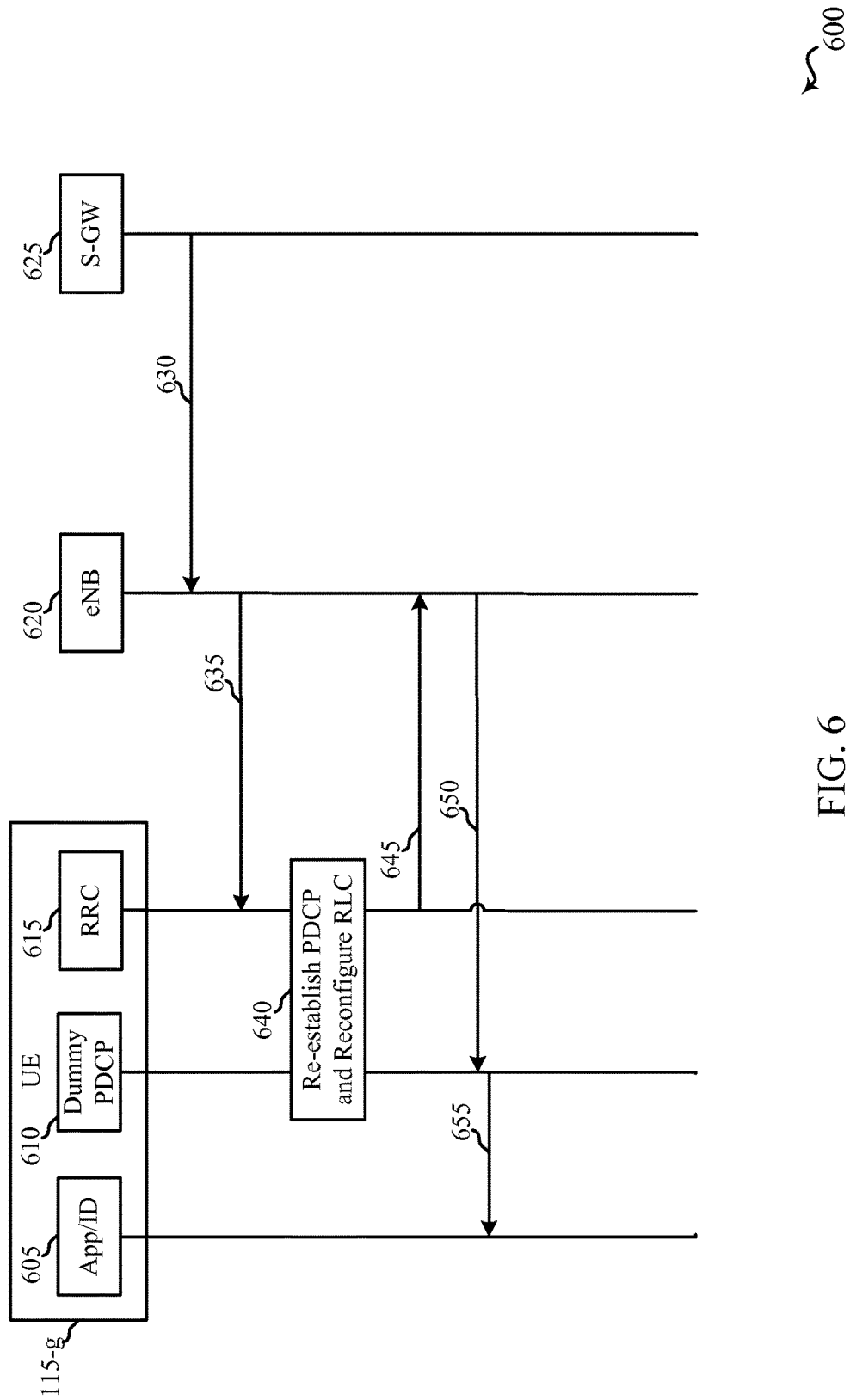
FIG. 6 shows a diagram illustrating another example of communications and actions that may be involved for resetting a mobile device for a downlink communication, in accordance with various aspects of the present disclosure.

FIG. 6 shows a diagram illustrating another example 600 of communications and actions that may be involved for resetting a UE 115-*g* for a downlink communication. In this example 600, the UE 115-*g* has been set up for D2D communications as described with reference to the UE 115-*d* in FIG. 3. Thus, the eNB-based suspension of FIG. 3 may have been implemented prior to the beginning of example 600.

The UE 115-*g* may include an application 605 (e.g., a particular application or the communications manager of the UE), a dummy PDCP component 610 and a radio resource control (RRC) component 615. The UE 115-*g* may be an example of one of the UEs 115 illustrated in FIG. 1.

A base station or eNB 620, which may be an example of one of the base stations 105 illustrated in FIG. 1, is shown in the example 600. Also, a serving gateway (S-GW) 625, which may be an example of the S-GW 145 illustrated in FIG. 1, is shown.

Receipt of downlink data for the UE 115-*g* at the S-GW 625 may be forwarded to the eNB 620 via a message 630 because the S1 bearers are already established. Upon arrival of the downlink data at the eNB 620 for the EPS bearers with no DRB established, the eNB 620 may buffer the downlink data. The eNB 620 may then send a message 635 to the RRC 615 to perform an RRC connection reconfiguration procedure 640 to set up a DRB(s) for the data to be received. For example, the message 635 may indicate the DRB(s) to be configured and used for the downlink data. The procedure 640 may involve re-establishing PDCP(s) and reconfiguring RLC(s) for the indicated DRB(s). Upon completion of the procedure 640, the RRC 615 may send a message 645 to the eNB 620 to indicate that the RRC connection reconfiguration is complete. The buffered downlink data then may be sent from the eNB 620 to the re-established PDCP (replacing the dummy PDCP 610) via a message 650. The re-established PDCP may send the downlink data via a message 665 to the application 605.

Once the downlink data has been received by the UE 115-*g*, the UE 115-*g* may be returned to the D2D communication mode, for example, by repeating the communications and actions such as described above with respect to FIG. 3.

Figure 7A:
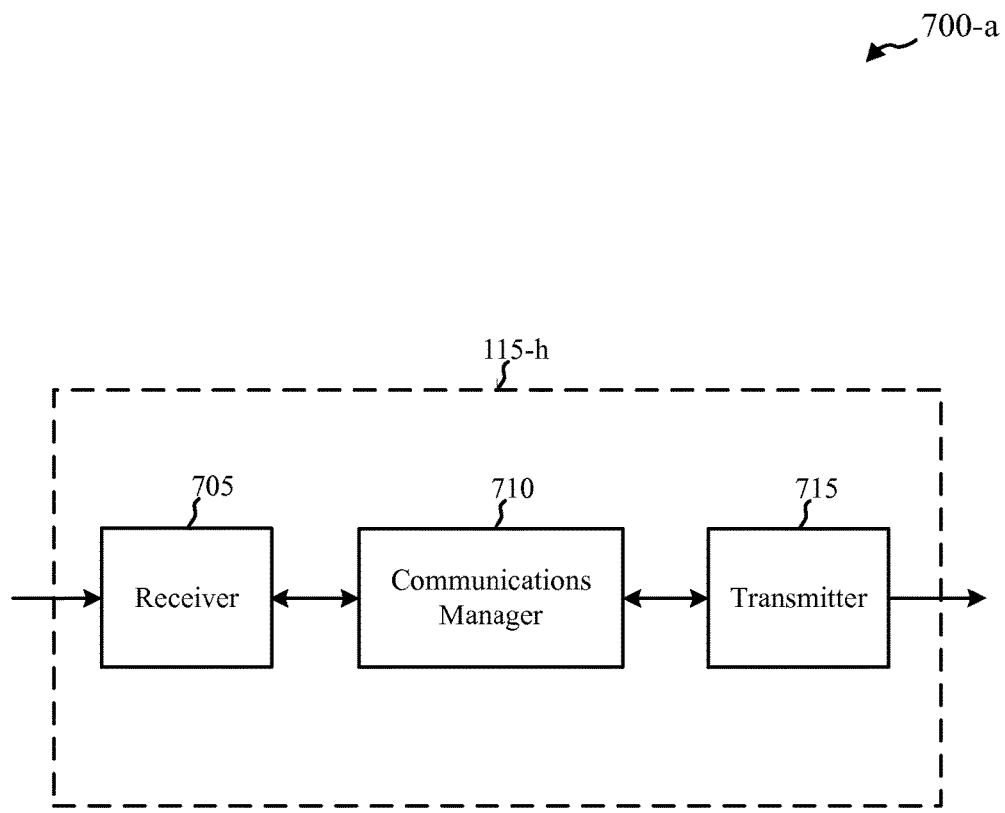
FIG. 7A shows a block diagram of an example of an apparatus that may be used for wireless communications, in accordance with various aspects of the present disclosure.

Turning now to FIG. 7A, a block diagram 700-*a* of an apparatus 115-*h* that may be used for wireless communications, in accordance with various aspects of the present disclosure, is shown. In some implementations, the apparatus 115-*h* may be an example of various aspects of the UEs 115 described with reference to FIGS. 1, 2, 3, 4, 5 and/or 6. The apparatus 115-*h* may also be a processor. The apparatus 115-*h* may include a receiver 705, a communications manager 710, and/or a transmitter 715. Each of these components may be in communication with each other.

The components of the apparatus 115-*h* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the receiver 705 may be or include a radio frequency (RF) receiver. The receiver 705 may be used to receive various types of data and/or control signals (e.g., transmissions) over communication link(s) (e.g., physical channels) of a wireless communication system, such as communication links 125 of the wireless communication system 100 described with reference to FIG. 1.

In some implementations, the transmitter 715 may be or include an RF transmitter. The transmitter 715 may be used to transmit various types of data and/or control signals (e.g., transmissions) over communication link(s) (e.g., physical channels) of a wireless communication system, such as communication links 125 of the wireless communication system 100 described with reference to FIG. 1.

In some implementations, the communications manager 710 may be used to manage wireless communications using the receiver 705, the transmitter 715, or both. For example, the communications manager 710 may be used to manage wireless communications in uplink and downlink directions via a base station 105, such as described with reference to FIG. 1. The communications manager 710 also may be used to manage wireless communications directly between the apparatus 115-*h* and other devices, such as the UEs 115 described with reference to FIG. 1.

In some implementations, the communications manager 710 may be configured to implement transitions of the apparatus 115-*h* between different modes of operation, such as for different service types. As discussed above, different service types may use different bearer configurations. As such, the communications manager 710 may be configured to manage bearer configurations so as to provide better resource management. For example, the communications manager 710 may be configured to locally suspend bearers as appropriate for a given service type. In particular, the communications manager may be configured to implement various operations to carry out the communications and actions for the UEs 115 described above with respect to FIGS. 2, 3, 4, 5 and/or 6. As such, the communications manager 710, either alone or in combination with receiver 705, the transmitter 715 or both, may be means for performing such communications and actions.

Figure 7B:
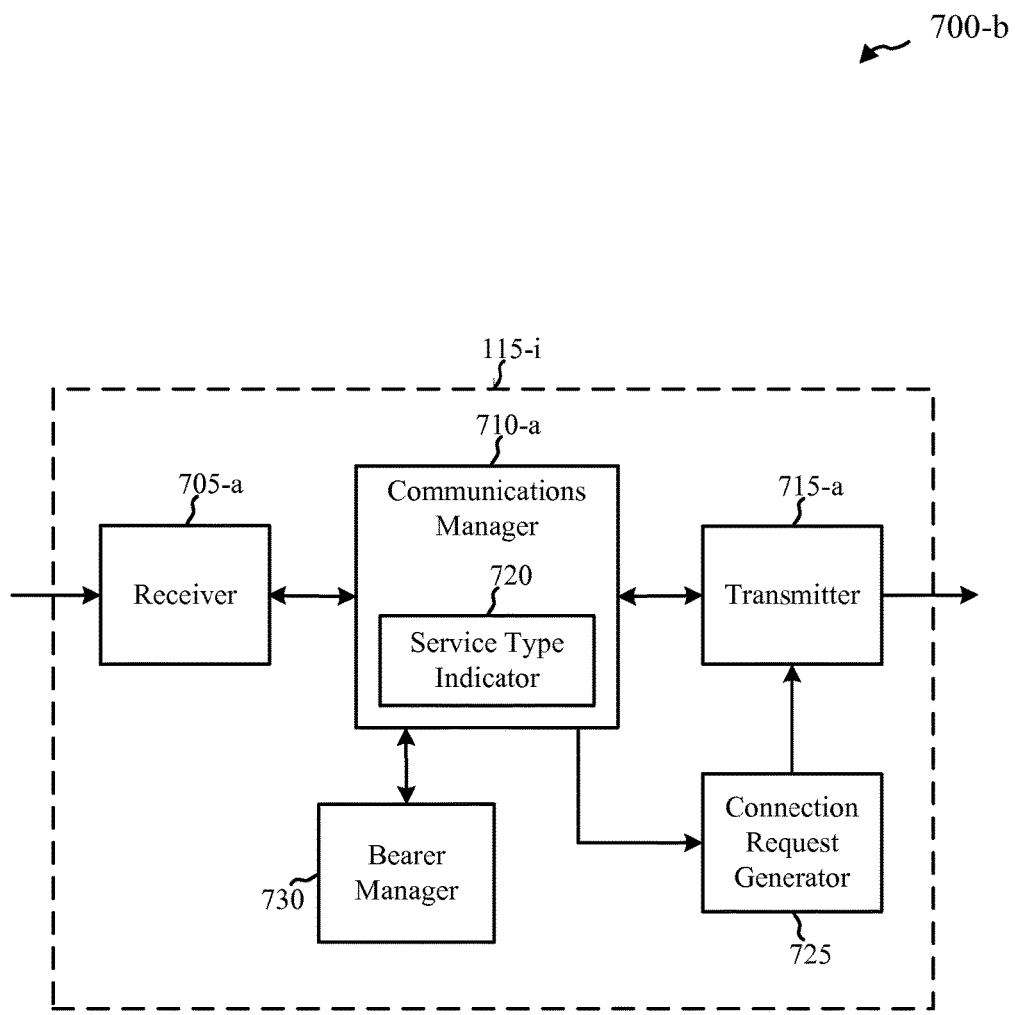
FIG. 7B shows a block diagram of another example of an apparatus that may be used for wireless communications, in accordance with various aspects of the present disclosure.

FIG. 7B shows a block diagram 700-*b* of an apparatus 115-*i* that may be used for wireless communications, in accordance with various aspects of the present disclosure. In some implementations, the apparatus 115-*i* may be an example of various aspects of the UEs 115 described with reference to FIGS. 1, 2, 3, 4, 5 and/or 6, and/or the apparatus 115-*h* described with reference to FIG. 7A. The apparatus 115-*i* may also be a processor. The apparatus 115-*i* may include a receiver 705-*a*, a communications manager 710-*a*, and/or a transmitter 715-*a*. The apparatus 115-I also may include a service type indicator 720, a connection request generator 725 and/or a bearer manager 730. Each of these components may be in communication with each other.

The components of the apparatus 115-*i* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the receiver 705-a and the transmitter 715-a may be configured as described with respect to FIG. 7A. The communications manager 710-a also may be configured as described with respect to FIG. 7A. Further, the communications manager 710-a may include or cooperate with the service type indicator 720.

The service type indicator 720 may be configured to determine or otherwise indicate a type of service for a given application or a given communication. For example, as described above, the service type indicator 720 may indicate one service type for D2D communications and another service type for communications via a base station or eNB. In general, different service types may be indicated for communications that have different bearer configuration needs. Thus, it should be understood that D2D communications is only one example of a service type that may not need all bearers to be configured.

The service type indicator 720 may inform the communications manager 710-a regarding the current service type to be implemented. The communications manager then may instruct or otherwise control the connection request generator 725 to generate or otherwise create a connection request, such as a service request (SR) or an extended service request (ESR) as described above with respect to FIGS. 2 and 3, for example. The generated connection request thus may indicate the service type, and also may indicates a subset of EPS bearers that are to be active (e.g., via an EPS bearer context status IE). The connection request generator 725 may provide the generated connection request directly to the transmitter 715-a for transmission, or to the communications manager 710-a to manage transmission thereof.

The communications manager 710-a may also cooperate with the bearer manager 730 to implement a suitable bearer configuration for the indicated service type. Thus, it should be understood that the bearer manager 730 may be configured to configure DRBs (PDCPs and RLCs) as described above with respect to FIGS. 2 and/or 3, and to reconfigure/re-establish as described above with respect to FIGS. 4, 5 and/or 6. For example, with reference to FIG. 2, the receiver 705-a may receive message 265 from the eNB 225 and provide the message 265 to the communications manager 710-a. The communications manager 710-a may instruct or otherwise cooperate with the bearer manager 730 to perform the configure DRB procedure 270 in accordance with message 265. Upon completion of the procedure 270, the communications manager 710-a may cause the transmitter 715-a to send message 275 to the eNB 225 and may provide message 272 to the NAS 210.

Thus, the bearer manager 730, either alone or in combination with the communications manager 710-a, may be means for establishing a set of bearers, means for configuring, reconfiguring or activating bearers, and/or means for suspending bearers as described herein.

Figure 8:
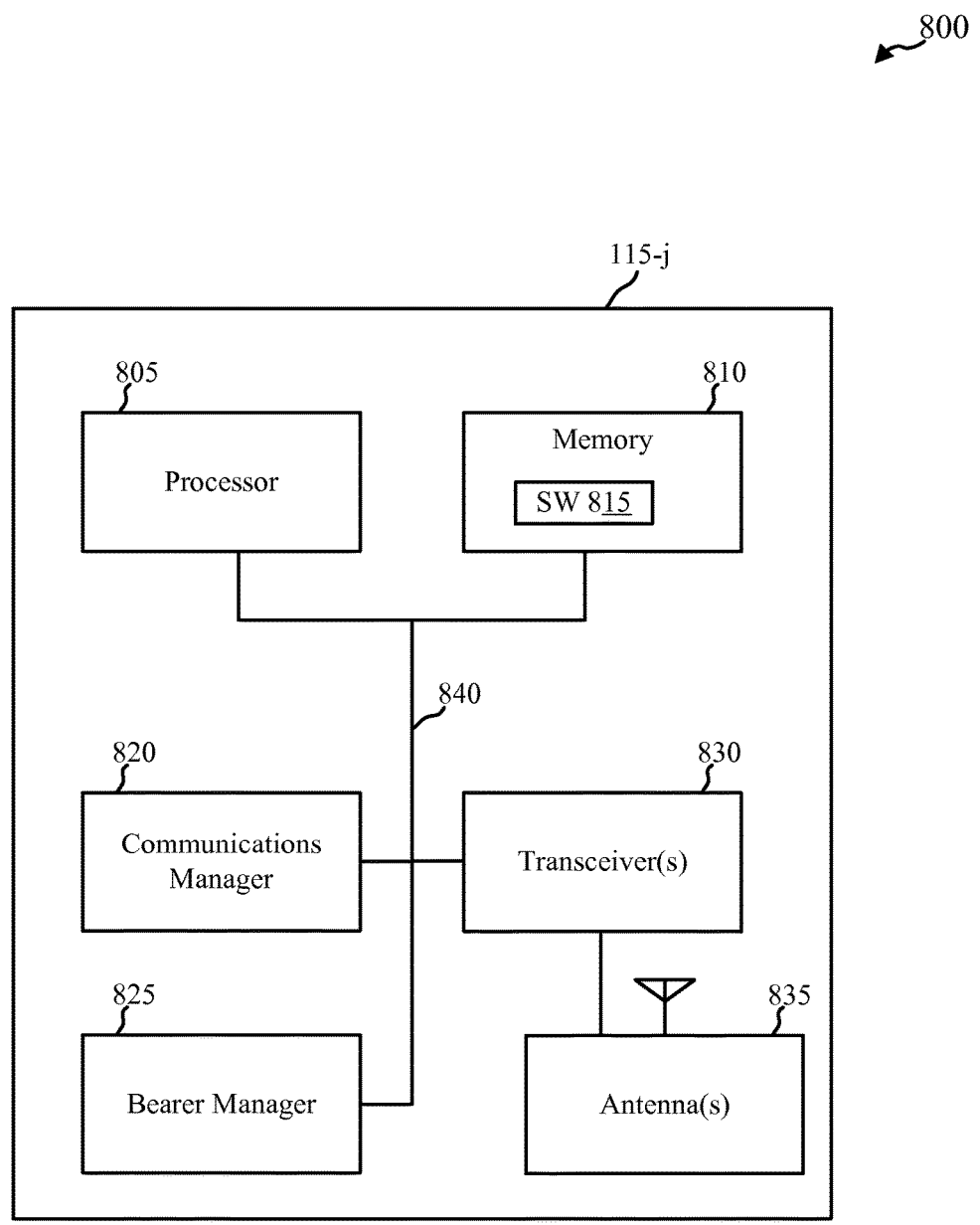
FIG. 8 shows a block diagram illustrating an example of an architecture for a user equipment (UE) configured for wireless communications, in accordance with various aspects of the present disclosure.

FIG. 8 shows a block diagram 800 illustrating an example of an architecture for a UE 115-j configured for wireless communications, in accordance with various aspects of the present disclosure. The UE 115-j may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 115-j may in some cases have an internal power supply (not shown), such as a small battery, to facilitate mobile operation. In some embodiments, the UE 115-j may be an example of various aspects of the apparatuses 115-h and/or 115-i described with reference to FIGS. 7A and/or 7B, and/or the UEs 115 described with reference to FIG. 1. The UE 115-j may be configured to implement at least some of the features and functions described with reference to FIGS. 1, 2, 3, 4, 5 and/or 6. The UE 115-j may be configured to communicate with a base station 105 and other UEs 115 described with reference to FIG. 1.

The UE 115-j may include a processor 805, a memory 810, a communications manager 820, a bearer manager 825, at least one transceiver 830, and/or at least one antenna 835. Each of these components may be in communication with each other, directly or indirectly, over a bus 840.

The memory 810 may include random access memory (RAM) and/or read-only memory (ROM). The memory 810 may store computer-readable, computer-executable software (SW) code 815 containing instructions that are configured to, when executed, cause the processor 805 to perform various functions described herein for communicating according to various service types and configuring aspects of the UE 115-j accordingly. Alternatively, the software code 815 may not be directly executable by the processor 805 but be configured to cause the UE 115-j (e.g., when compiled and executed) to perform various of the functions described herein.

The processor 805 may include an intelligent hardware device, e.g., a CPU, a microcontroller, an ASIC, etc. The processor 805 may process information received through the transceiver (s) 830 and/or information to be sent to the transceiver (s) 830 for transmission through the antenna(s) 835. The processor 805 may handle, alone or in connection with the communications manager 820, various aspects of communicating according to various service types.

The transceiver (s) 830 may include a modem configured to modulate packets and provide the modulated packets to the antenna(s) 835 for transmission, and to demodulate packets received from the antenna(s) 835. The transceiver(s) 830 may in some cases be implemented as one or more transmitters and one or more separate receivers. The transceiver(s) 830 may support communications according to the particular service type in use. The transceiver(s) 830 may be configured to communicate bi-directionally, via the antenna(s) 835, with the base station(s) and/or other UEs 115 described with reference to FIG. 1. While the UE 115-j may include a single antenna 835, there may be implementations in which the UE 115-j may include multiple antennas 835.

The communications manager 820 may be configured to perform and/or control some or all of the features and/or functions described with reference to FIGS. 1, 2, 3, 4, 5 and/or 6 related to wireless communication and bearer management. For example, communications manager 820 may be configured to activate and/or suspend bearers in accordance with the particular service type in use. The communications manager 820 may be configured to control or otherwise cooperate with the bearer manager 825 to support desired communications. The communications manager 820 may be an example of various aspects of the communications manager 710 and/or 710-a described with reference to FIGS. 7A and/or 7B. The communications manager 820, or portions of it, may include a processor, and/or some or all of the functionality of the communications manager 820 may be performed by the processor 805 and/or in connection with the processor 805.

Figure 9:
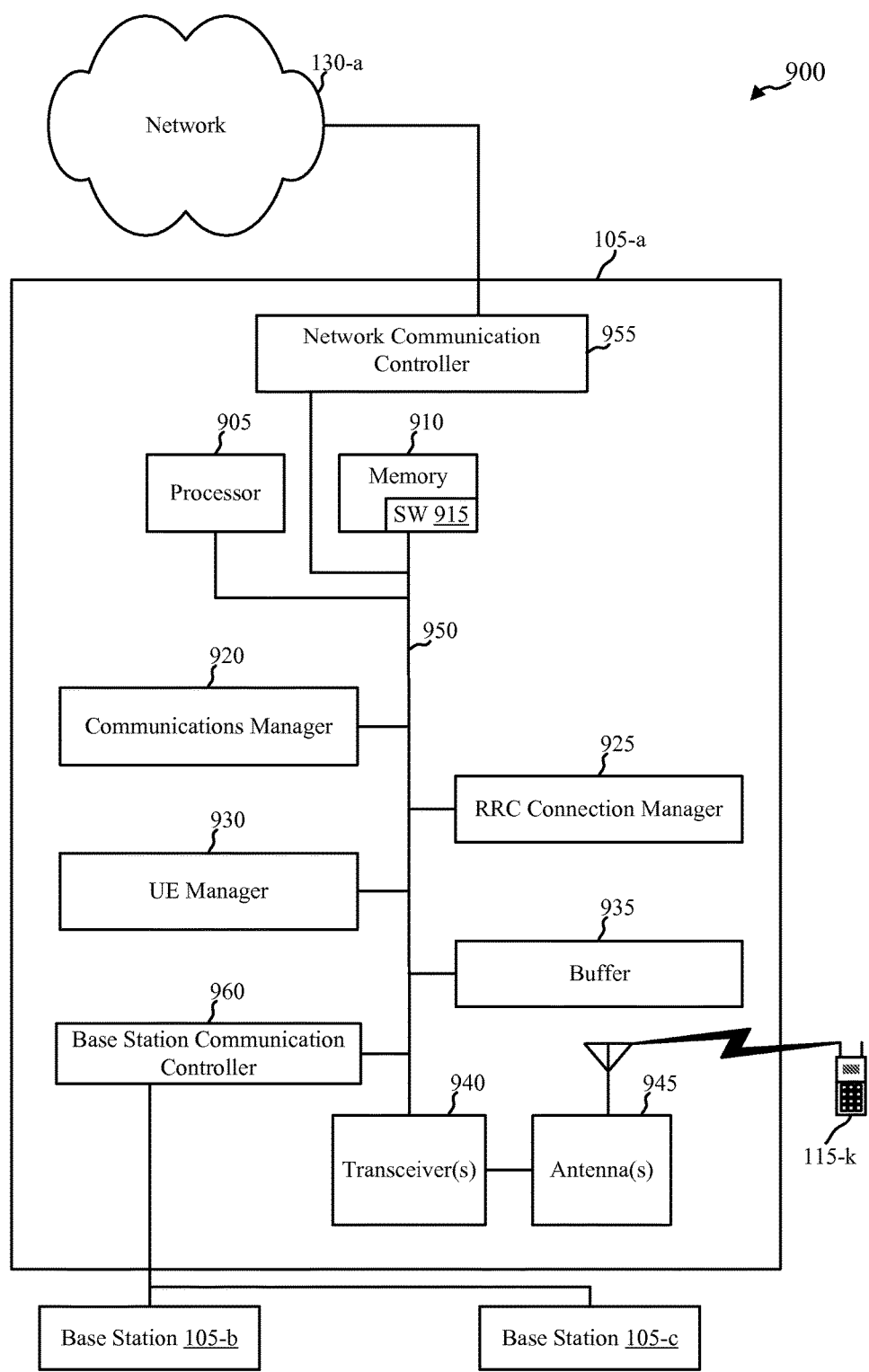
FIG. 9 shows a block diagram illustrating an example of an architecture for an evolved NodeB (eNB) as part of a communications system configured for wireless communications, in accordance with various aspects of the present disclosure.

FIG. 9 shows a block diagram illustrating an example of an architecture for a base station 105-a, e.g., eNB, as part of a communications system 900 that may be configured wireless communications in accordance with various embodiments. The system 900 may be an example of aspects of the system 100 depicted in FIG. 1. Further, aspects of the base station 105-a may be implemented in a base station 105 of FIG. 1 and/or in an eNB 225, 325, 425, 520 and/or 620 of FIGS. 2, 3, 4, 5 and 6. The base station 105-a may include a processor 905, memory 910, a communications manager 920, an RRC connection manager 925, a UE manager 930, a buffer 935, transceiver(s) 940 and antenna(s) 945, which each may be in communication, directly or indirectly, with each other (e.g., over one or more buses 950). The transceiver(s) 940 may be configured to communicate bi-directionally, via the antenna(s) 945, with a UE 115-k, which may be a multi-mode mobile device. The transceiver(s) 940 (and/or other components of the base station 105-a) may also be configured to communicate bi-directionally with one or more networks. In some cases, the base station 105-a may communicate with a core network 130-a through a network communications controller 955. Base station 105-a may be an example of an eNodeB base station, a Home eNodeB base station, a NodeB base station, and/or a Home NodeB base station.

Base station 105-a may also communicate with other base stations 105, such as base station 105-b and base station 105-c. Each of the base stations 105 may communicate with UE 115-k using different wireless communications technologies, such as different radio access technologies. In some cases, base station 105-a may communicate with other base stations such as base station 105-b and/or base station 105-c using a base station communication controller 960. In some embodiments, base station communication controller 960 may provide an X2 interface within an LTE/LTE-A wireless communication technology to provide communication between some of the base stations 105. In some embodiments, base station 105-a may communicate with other base stations through the core network 130-a.

The memory 910 may include random access memory (RAM) and read-only memory (ROM). The memory 910 may also store computer-readable, computer-executable software code 915 containing instructions that are configured to, when executed, cause the processor 905 to perform various functions described herein (e.g., call processing, bearer management, UE management, message routing, error identification, access control, etc.). Alternatively, the software code 915 may not be directly executable by the processor 905 but be configured to cause the computer, e.g., when compiled and executed, to perform functions described herein.

The processor 905 may include an intelligent hardware device, e.g., a central processing unit (CPU) such as those made by Intel® Corporation or AMD®, a microcontroller, an application-specific integrated circuit (ASIC), etc.

The transceiver(s) 940 may include one or more modems configured to modulate the packets and provide the modulated packets to the antenna(s) 945 for transmission, and to demodulate packets received from the antenna(s) 945. While some examples of the base station 105-a may include a single antenna 945, the base station 105-a preferably includes multiple antennas 945 for multiple links which may support carrier aggregation. For example, one or more links may be used to support macro communications with UE 115-k.

The communications manager 920 may manage communications with UE 115-k, other base stations 105-b and 105-c, and the network 130-a. By way of example, the communications manager 920 may be a component of the base station 105-a in communication with some or all of the other components of the base station 105-a via the bus 950. Alternatively, functionality of the communications manager 920 may be implemented as a component of the transceiver(s) 940, as a computer program product, and/or as one or more controller elements of the processor 905.

The components of base station 105-a may be configured to implement aspects discussed above with respect the base stations 105 of FIG. 1 as well as aspects discussed above with respect to the eNBs 225, 325, 425, 520 and/or 620 of FIGS. 2, 3, 4, 5 and 6, respectively, and may not be repeated here for the sake of brevity. For example, base station 105-a may include the RRC connection manager 925 to facilitate the random access procedures 250 and/or 340 described with respect to FIGS. 2 and 3, respectively. The base station 105-a may include the UE manager 930 to keep track of information regarding individual UEs (e.g., service type, bearer configuration and status, etc.) and may facilitate bearer configuration with individual UEs. The base station 105-a may include the buffer 935 to buffer data intended for a UE that is not yet configured to receive the data, such as described above.

Figure 10:
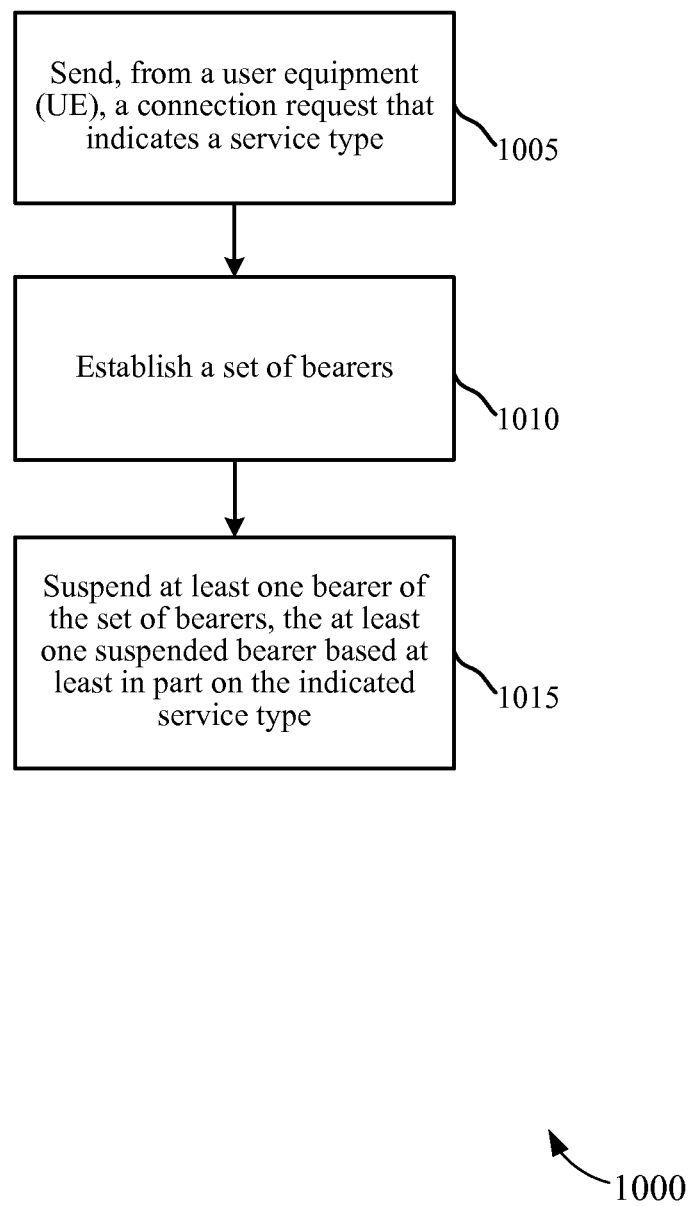
FIG. 10 is a flowchart illustrating an example of a method for wireless communication, in accordance with various aspects of the present disclosure.

FIG. 10 is a flowchart illustrating an example of a method 1000 for wireless communication in accordance with various aspects of the present disclosure. In particular, the method 1000 may provide resource management by suspending bearers that are not needed for a particular service type. For clarity, the method 1000 is described below with reference to aspects of the UEs 115 described with reference to FIGS. 1, 2, 3, 4, 5, 6 and/or 8, and/or the apparatuses 115 described with reference to FIGS. 7A and/or 7B. In some implementations, such a UE or apparatus may execute one or more sets of codes to control the functional elements of the UE or apparatus to perform the functions described below.

At block 1005, the UE 115 may send a connection request that indicates a service type. At block 1010, a set of bearers may be established. In some implementations, the UE 115 may be configured to establish the set of bearers in cooperation with a base station 105 as described with respect to FIGS. 1 and 9, or eNBs 225, 325, 425, 520 and/or 620 described with respect to FIGS. 2, 3, 4, 5 and 6, respectively.

At block 1015, the UE 115 may suspend a bearer of the set of bearers. The suspended bearer(s) may be based, at least in part, on the indicated service type. Thus, when a service type for the UE 115 does not need all bearers of the set of bearers, the UE 115 may suspend a bearer(s) to conserve network resources.

Figure 11:
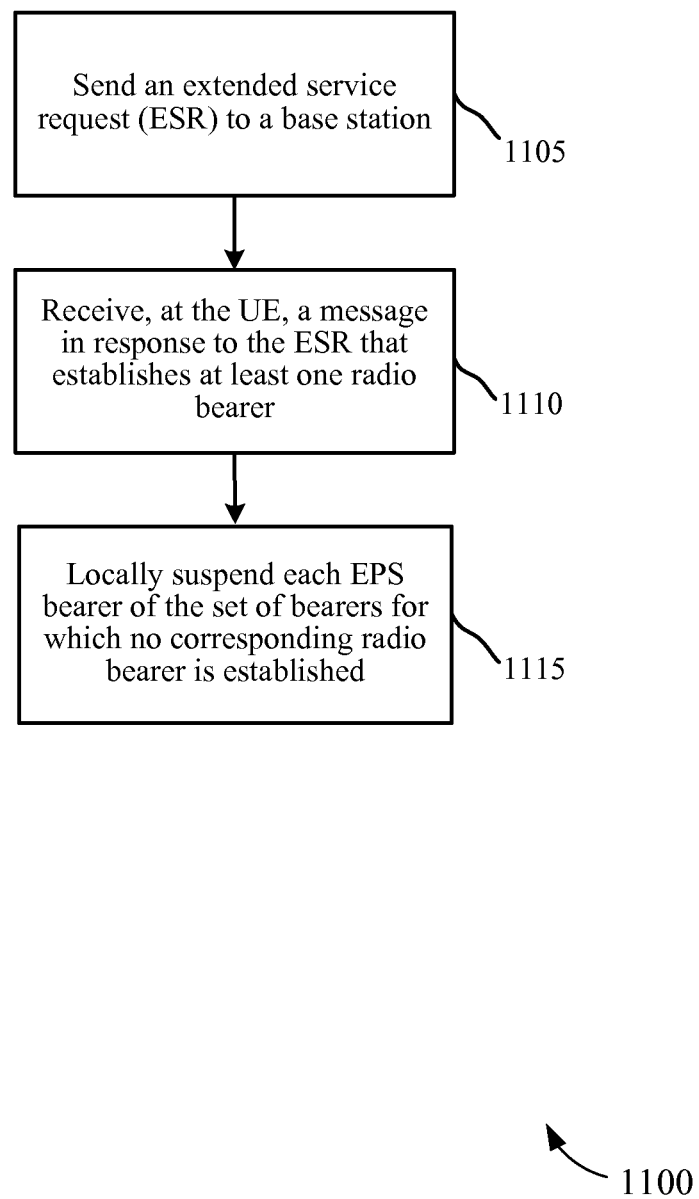
FIG. 11 is a flowchart illustrating another example of a method for wireless communication, in accordance with various aspects of the present disclosure.

FIG. 11 is a flowchart illustrating an example of a method 1100 for wireless communication in accordance with various aspects of the present disclosure. In particular, the method 1100 may provide resource management by suspending bearers that are not needed for a particular service type. For clarity, the method 1100 is described below with reference to aspects of the UEs 115 described with reference to FIGS. 1, 2, 5 and/or 8, and/or the apparatuses 115 described with reference to FIGS. 7A and/or 7B. In some implementations, such a UE or apparatus may execute one or more sets of codes to control the functional elements of the UE or apparatus to perform the functions described below.

At block 1105, the UE 115 may send a connection request in the form of an extended service request (ESR) to a base station. As discussed above, the ESR may indicate a service type and may include an EPS bearer context status IE, which indicates the bearer(s) to be kept active. At block 1110, the UE 115 may receive a message in response to the ESR that establishes at least one radio bearer (e.g., corresponding to a default EPS bearer).

At block 1115, the UE 115 may locally suspend each EPS bearer of the set of bearers for which no corresponding radio bearer is establish (e.g., at block 1110). The EPS bearer context status IE of the ESR correspond to the service type indicated by the ESR; thus, the suspended EPS bearer(s) may be based, at least in part, on the ESR, the indicated service type, the EPS bearer context status IE, and/or the lack of establishment of corresponding radio bearers.

Figure 12:
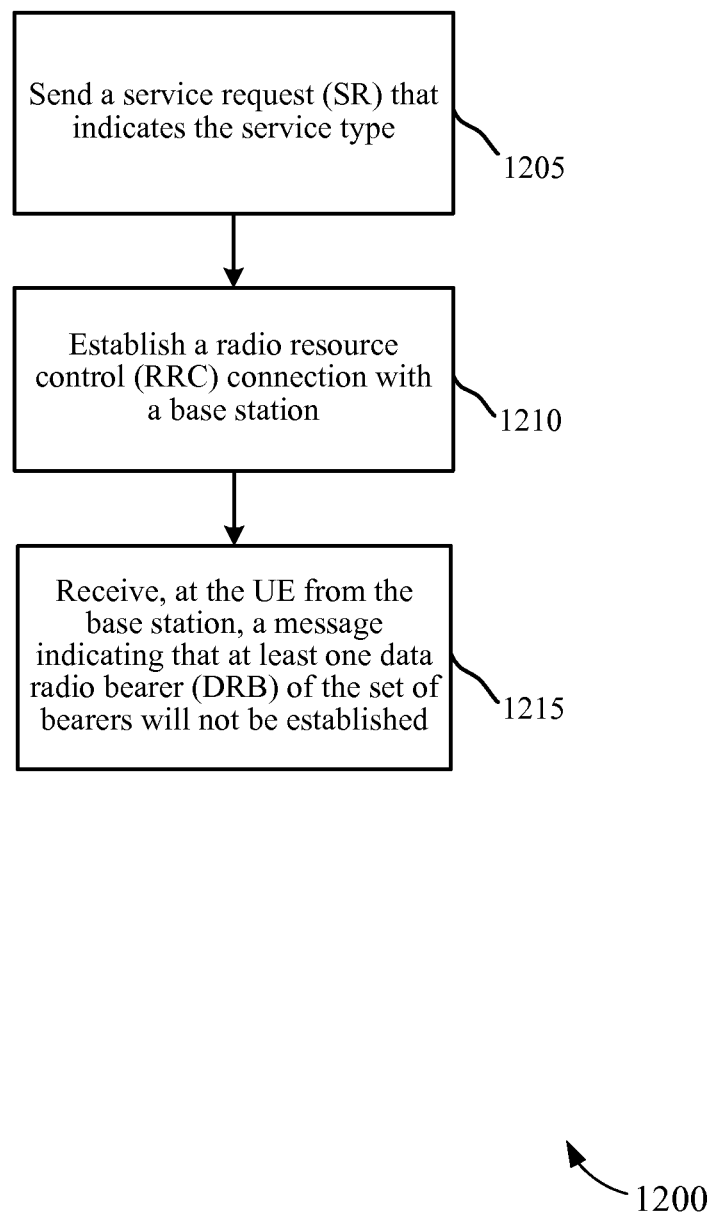
FIG. 12 is a flowchart illustrating yet another example of a method for wireless communication, in accordance with various aspects of the present disclosure.

FIG. 12 is a flowchart illustrating yet another example of a method 1200 for wireless communication in accordance with various aspects of the present disclosure. In particular, the method 1200 may provide resource management by suspending bearers that are not needed for a particular service type. For clarity, the method 1200 is described below with reference to aspects of the UEs 115 described with reference to FIGS. 1, 3, 4, 6 and/or 8, and/or the apparatuses 115 described with reference to FIGS. 7A and/or 7B. In some implementations, such a UE or apparatus may execute one or more sets of codes to control the functional elements of the UE or apparatus to perform the functions described below.

At block 1205, the UE 115 may send a connection request in the form of a service request (SR) to a base station. As discussed above, the SR may indicate a service type. At block 1210, the UE 115 may establish a radio resource control (RRC) connection with the base station.

At block 1215, the UE 115 may receive a message in response from the base station indicating that at least one data radio bearer (DRB) of the set of bearers will not be established. In such a manner, the indicated DRBs (and the corresponding EPS bearers) may be suspended.

Figure 13:
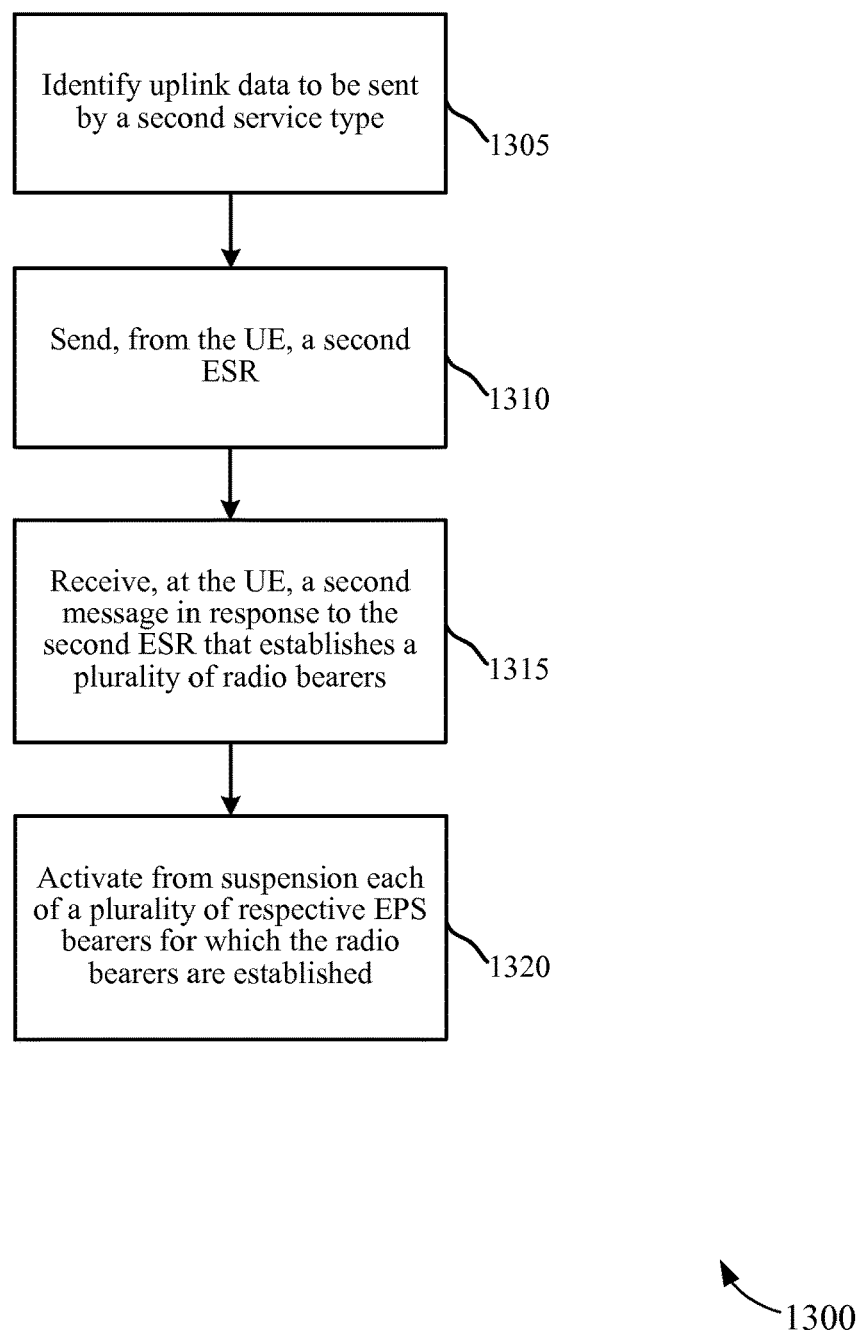
FIG. 13 is a flowchart illustrating a further method for wireless communication that may be implemented subsequent to the method of FIG. 11, in accordance with various aspects of the present disclosure.

FIG. 13 is a flowchart illustrating a method 1300 for wireless communication that may be implemented subsequent to the method of FIG. 11, in accordance with various aspects of the present disclosure. In particular, the method 1300 may transition a UE or apparatus from a first service type using fewer bearers to a second service type using more bearers. For clarity, the method 1300 is described below with reference to aspects of the UEs 115 described with reference to FIGS. 1, 5 and/or 8, and/or the apparatuses 115 described with reference to FIGS. 7A and/or 7B. In some implementations, such a UE or apparatus may execute one or more sets of codes to control the functional elements of the UE or apparatus to perform the functions described below.

Initially, the UE 115 may be configured for D2D communications, such as described with respect to FIGS. 2, 10 and/or 11. At block 1305, the UE 115 may identify uplink data to be sent by a second service type (e.g., uplink communication via a base station).

At block 1310, the UE 115 may send a second ESR, which may be triggered by the identification of uplink data. As discussed above, the second ESR may indicate a second service type (different from the D2D communication service type) and may include an EPS bearer context status IE, which indicates a different subset of bearers to be kept active.

At block 1315, the UE 115 may receive a second message in response to the second ESR that establishes at least one radio bearer. Each radio bearer may correspond to a respective EPS bearer indicated by the second EPS bearer context status IE to be active.

At block 1320, the UE 115 may activate from suspension each respective EPS bearer for which the corresponding radio bearer is established. Thus, the UE 115 may manage bearers according to the current service type used.

Figure 14:
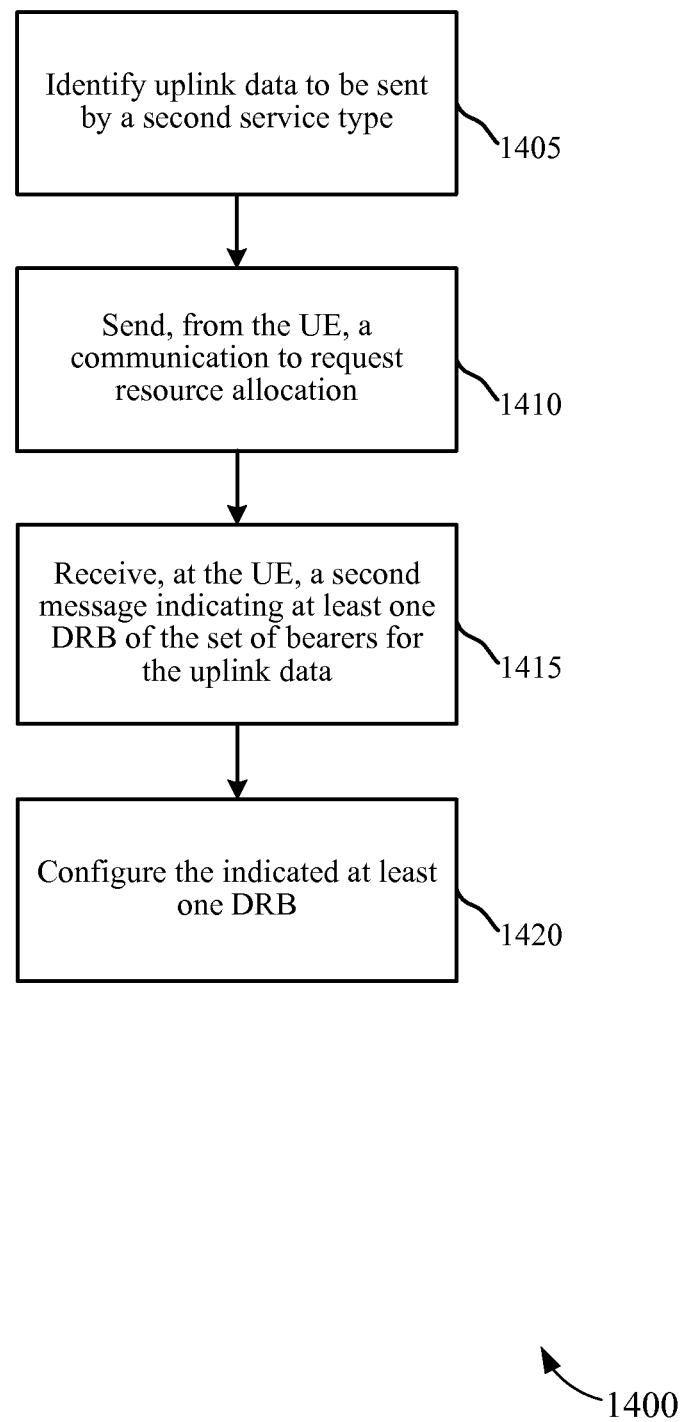
FIG. 14 is a flowchart illustrating a further method for wireless communication that may be implemented subsequent to the method of FIG. 12, in accordance with various aspects of the present disclosure.

FIG. 14 is a flowchart illustrating a method 1400 for wireless communication that may be implemented subsequent to the method of FIG. 12, in accordance with various aspects of the present disclosure. In particular, the method 1400 may transition a UE or apparatus from a first service type using fewer bearers to a second service type using more bearers. For clarity, the method 1400 is described below with reference to aspects of the UEs 115 described with reference to FIGS. 1, 4 and/or 8, and/or the apparatuses 115 described with reference to FIGS. 7A and/or 7B. In some implementations, such a UE or apparatus may execute one or more sets of codes to control the functional elements of the UE or apparatus to perform the functions described below.

Initially, the UE 115 may be configured for D2D communications, such as described with respect to FIGS. 3, 10 and/or 12. At block 1405, the UE 115 may identify uplink data to be sent by a second service type (e.g., uplink communication via a base station).

At block 1410, the UE 115 may send a communication to request resource allocation for the uplink data. At block 1415, the UE 115 may receive a second message, in response to the communication (block 1410), that indicates at least one DRB of the set of bearers for the uplink data.

At block 1420, the UE 115 may configure the indicated at least one DRB, and may activate from suspension each respective EPS bearer for which the corresponding radio bearer is configured. Thus, the UE 115 may manage bearers according to the current service type used.

Figure 15:
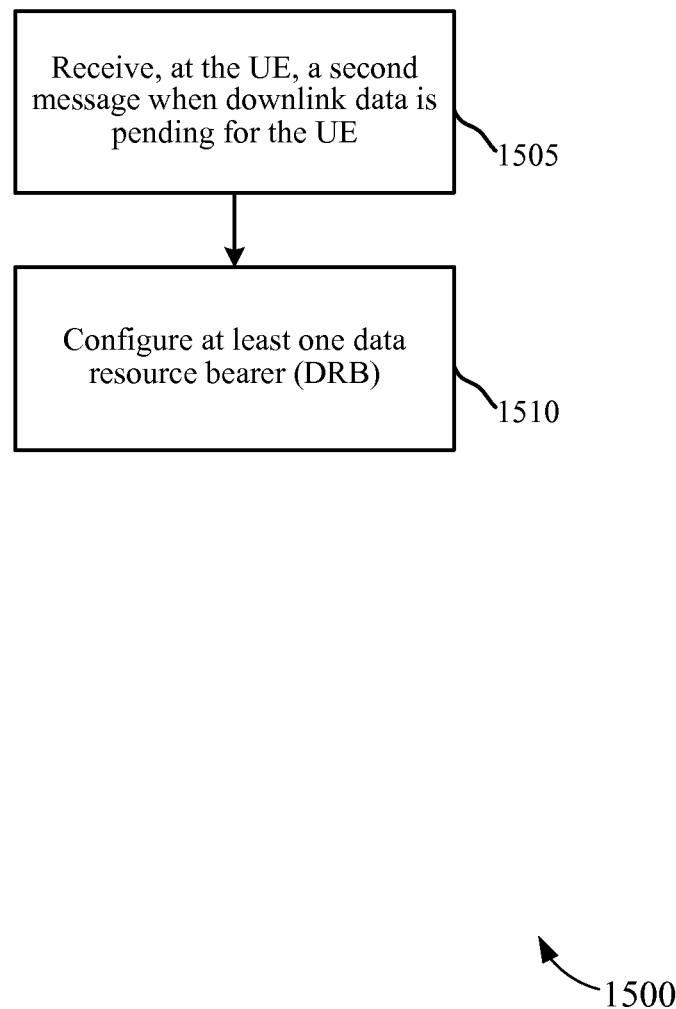
FIG. 15 is a flowchart illustrating another method for wireless communication that may be implemented subsequent to the method of FIG. 11 or FIG. 12, in accordance with various aspects of the present disclosure.

FIG. 15 is a flowchart illustrating another method 14 for wireless communication that may be implemented subsequent to the method of FIG. 11 or FIG. 12, in accordance with various aspects of the present disclosure. In particular, the method 1500 may transition a UE or apparatus from a first service type using fewer bearers to a second service type using more bearers. For clarity, the method 1500 is described below with reference to aspects of the UEs 115 described with reference to FIGS. 1, 5, 6 and/or 8, and/or the apparatuses 115 described with reference to FIGS. 7A and/or 7B. In some implementations, such a UE or apparatus may execute one or more sets of codes to control the functional elements of the UE or apparatus to perform the functions described below.

Initially, the UE 115 may be configured for D2D communications, such as described with respect to FIGS. 2, 3, 10, 11 and/or 12. At block 1505, the UE 115 may receive a second message when downlink data is pending for the UE (e.g., at the S-GW 535 in FIG. 5 of the eNB 625 in FIG. 6).

At block 1510, the UE 115 may configure at least one DRB to support reception of the downlink data. In the case that the UE is initially configured according to the method of FIG. 12, the second message received at block 1505 may indicate at least one DRB of the set of bearers for the downlink data. Thus, in such case the UE 115 may configure the indicated at least one DRB at block 1510.

In the case that the UE is initially configured according to the method of FIG. 11, the second message received at block 1505 may indicate at least one EPS bearer of the set of bearers for the pending downlink data. Thus, in such case the UE 115 may configure at least one DRB corresponding to the indicated at least one EPS bearer.

Alternatively, in the case that the UE is initially configured according to the method of FIG. 11, the UE 115 may send a second ESR in response to the second message received at block 1505. Thus, in such case the UE 115 may configure a DRB(s) and activate locally suspended EPS bearer(s) as indicated in the second ESR.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
sending, from a user equipment (UE), a connection request that indicates a service type and that includes an information element (IE), wherein the IE indicates at least one bearer of a set of bearers that is to be suspended for communications of the indicated service type and an evolved packet system (EPS) bearer context status IE that indicates a subset of EPS bearers of the set of bearers that are to be active and the connection request comprises an extended service request (ESR) indicating the service type and wherein the IE comprises the evolved packet system (EPS) bearer context status IE that indicates a subset of EPS bearers of the set of bearers that are to be active and an extended service request (ESR) indicating the service type;
establishing the set of bearers;
suspending at least one bearer of the set of bearers after sending the connection request, the at least one suspended bearer comprising the at least one bearer indicated by the IE included in the connection request sent by the UE;
receiving, at the UE, a message in response to the ESR that establishes at least one radio bearer corresponding to a respective EPS bearer of the subset indicated by the EPS bearer context status IE to be active, and wherein suspending comprises locally suspending each EPS bearer of the set of bearers for which no corresponding radio bearer is established;
sending, from the UE, a second ESR that indicates a second service type and includes a second EPS bearer context status IE that indicates a second subset of EPS bearers of the set of bearers that are to be active;
receiving, at the UE, a second message in response to the second ESR that establishes at least one radio bearer, each radio bearer corresponding to a respective EPS bearer indicated by the second EPS bearer context status IE to be active; and
activating from suspension each respective EPS bearer for which a corresponding radio bearer is established.

2. The method of claim 1, further comprising:
identifying uplink data to be sent by the second service type to trigger sending the second ESR.

3. The method of claim 1, wherein identifying uplink data to be sent by the second service type comprises:
identifying a radio resource control (RRC) error.

* * * * *